United States Patent
Zheng et al.

(10) Patent No.: US 11,988,103 B2
(45) Date of Patent: May 21, 2024

(54) AIRFOILS FOR A FAN SECTION OF A TURBINE ENGINE

(71) Applicant: General Electric Company, Schenectady, NY (US)

(72) Inventors: Li Zheng, Latham, NY (US); Nicholas Joseph Kray, Mason, OH (US); Changjie Sun, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/511,866

(22) Filed: Oct. 27, 2021

(65) Prior Publication Data
US 2023/0128806 A1  Apr. 27, 2023

(51) Int. Cl.
*F01D 5/14* (2006.01)
*F01D 5/28* (2006.01)
*F01D 25/00* (2006.01)

(52) U.S. Cl.
CPC ............. *F01D 25/005* (2013.01); *F01D 5/14* (2013.01); *F01D 5/28* (2013.01); F05D 2220/32 (2013.01); F05D 2230/60 (2013.01)

(58) Field of Classification Search
CPC . F01D 25/005; F01D 5/14; F01D 5/28; F05D 2220/32; F05D 2230/60
See application file for complete search history.

(56) References Cited

U.S. PATENT DOCUMENTS

| 2,637,405 | A | | 5/1953 | Stanley |
| 2,990,309 | A | | 6/1961 | Wahl et al. |
| 3,369,782 | A | | 2/1968 | Billig et al. |
| 3,476,625 | A | | 11/1969 | Slivinsky et al. |
| 4,010,530 | A | * | 3/1977 | Delgrosso ............ B23K 35/286 29/445 |
| 4,111,600 | A | * | 9/1978 | Rothman ................ F01D 5/147 416/224 |
| 4,329,119 | A | | 5/1982 | Baskin |
| 4,786,015 | A | | 11/1988 | Niggemann |
| 6,050,523 | A | | 4/2000 | Kraenzien |
| 6,655,633 | B1 | | 12/2003 | Chapman, Jr. |

(Continued)

FOREIGN PATENT DOCUMENTS

FR         3105292 A1      6/2021

OTHER PUBLICATIONS

Aircraft Propeller Auxiliary Systems, Aeronautics Guide, 5 pages. Retrieved from The Wayback Machine—https://web.archive.org/web/20210307050137/https:/www.aircraftsystemstech.com/p/propeller-auxiliarysystems-ice-control.html.

(Continued)

*Primary Examiner* — Courtney D Heinle
*Assistant Examiner* — Theodore C Ribadeneyra
(74) *Attorney, Agent, or Firm* — Dority & Manning, P.A.

(57) ABSTRACT

An airfoil for a fan section of a turbine engine may include a fan blade or an outlet guide vane formed of a first material, and an edge guard disposed about an edge of the fan blade. The edge guard may include a matrix composite that has a toughness that is greater than a toughness of the first material. The airfoil may include a fan blade or an outlet guide vane. The first material of the airfoil may include a metal alloy and/or a matrix composite. A method of manufacturing an airfoil for a fan section of a turbine engine may include manufacturing an edge guard, attaching the edge guard to the airfoil.

20 Claims, 12 Drawing Sheets

(56) References Cited

U.S. PATENT DOCUMENTS

| | | | |
|---|---|---|---|
| 7,063,763 B2 | 6/2006 | Chapman, Jr. | |
| 8,016,561 B2 | 9/2011 | Moniz et al. | |
| 8,061,997 B2 | 11/2011 | Le Hong et al. | |
| 8,088,498 B2* | 1/2012 | Smith | F01D 5/282 |
| | | | 428/678 |
| 8,091,227 B2 | 1/2012 | Hong | |
| 8,834,126 B2 | 9/2014 | Hansen et al. | |
| 8,844,877 B1 | 9/2014 | Driemeyer et al. | |
| 9,028,969 B2 | 5/2015 | Schmidt | |
| 9,139,287 B2 | 9/2015 | Folsom et al. | |
| 9,140,130 B2* | 9/2015 | Mironets | B22F 5/04 |
| 9,279,328 B2* | 3/2016 | Roy | F04D 29/324 |
| 9,598,966 B2* | 3/2017 | Klein | F01D 5/147 |
| 9,816,381 B2 | 11/2017 | Cortequisse | |
| 10,633,976 B2 | 4/2020 | Nissen et al. | |
| 10,788,053 B2 | 9/2020 | Kumar et al. | |
| 10,822,999 B2 | 11/2020 | Morris et al. | |
| 10,914,175 B2* | 2/2021 | Okabe | F01D 5/286 |
| 11,073,082 B2 | 7/2021 | Ivakitch et al. | |
| 2006/0018752 A1* | 1/2006 | LeMieux | F01D 11/00 |
| | | | 416/96 R |
| 2007/0092379 A1 | 4/2007 | Coupe et al. | |
| 2008/0041842 A1* | 2/2008 | Alexander | F01D 25/162 |
| | | | 219/541 |
| 2009/0208342 A1* | 8/2009 | Mons | F01D 5/28 |
| | | | 29/889.7 |
| 2010/0014964 A1* | 1/2010 | Smith | C23C 28/021 |
| | | | 415/200 |
| 2010/0054945 A1 | 3/2010 | McMillan et al. | |
| 2010/0148006 A1 | 6/2010 | Olmi et al. | |
| 2011/0182740 A1* | 7/2011 | Klinetob | F01D 5/147 |
| | | | 29/889.7 |
| 2011/0194941 A1* | 8/2011 | Parkin | B29C 70/48 |
| | | | 416/224 |
| 2011/0211967 A1* | 9/2011 | Deal | F01D 5/147 |
| | | | 29/889.71 |
| 2012/0021243 A1* | 1/2012 | Kray | F01D 5/28 |
| | | | 428/602 |
| 2012/0156049 A1 | 6/2012 | Hong | |
| 2013/0082142 A1 | 4/2013 | Li et al. | |
| 2013/0111908 A1* | 5/2013 | Murooka | F04D 29/324 |
| | | | 60/726 |
| 2013/0199934 A1* | 8/2013 | Parkos, Jr. | C25D 1/00 |
| | | | 205/76 |
| 2013/0220537 A1* | 8/2013 | Parkin | F04D 29/324 |
| | | | 156/60 |
| 2013/0230406 A1* | 9/2013 | Wilkins | F01D 5/28 |
| | | | 416/241 R |
| 2013/0280079 A1 | 10/2013 | Smith et al. | |
| 2013/0294891 A1 | 11/2013 | Neuhaeusler et al. | |
| 2014/0133987 A1 | 5/2014 | Guinaldo Fernandez et al. | |
| 2015/0086378 A1 | 3/2015 | Klein et al. | |
| 2015/0086379 A1 | 3/2015 | Pentony | |
| 2015/0104299 A1* | 4/2015 | Briend | F01D 25/005 |
| | | | 415/200 |
| 2015/0104323 A1 | 4/2015 | Franchet et al. | |
| 2015/0198141 A1* | 7/2015 | Hayden | F03D 1/0675 |
| | | | 416/212 R |
| 2015/0298787 A1 | 10/2015 | Nordin et al. | |
| 2015/0377030 A1* | 12/2015 | Murdock | F04D 29/324 |
| | | | 29/889 |
| 2016/0001407 A1* | 1/2016 | Hansen | F01D 5/288 |
| | | | 29/889.71 |
| 2016/0003060 A1* | 1/2016 | Cook | F01D 5/3007 |
| | | | 29/889.71 |
| 2016/0010468 A1* | 1/2016 | Kray | B23P 15/04 |
| | | | 416/224 |
| 2016/0032729 A1 | 2/2016 | Turner | |
| 2016/0032738 A1* | 2/2016 | Ding | C23C 28/00 |
| | | | 427/430.1 |
| 2016/0123158 A1* | 5/2016 | Hunziker | F01D 5/286 |
| | | | 416/224 |
| 2016/0167269 A1 | 6/2016 | Pautard | |
| 2016/0177732 A1* | 6/2016 | Whitehurst | F01D 5/147 |
| | | | 416/241 A |
| 2016/0186573 A1* | 6/2016 | McKaveney | F01D 5/147 |
| | | | 156/60 |
| 2016/0194091 A1* | 7/2016 | Obuchi | F01D 9/041 |
| | | | 415/200 |
| 2016/0201471 A1* | 7/2016 | Whitehurst | F04D 29/023 |
| | | | 416/224 |
| 2016/0201482 A1* | 7/2016 | Parkos, Jr. | C23F 1/00 |
| | | | 156/60 |
| 2016/0208624 A1* | 7/2016 | Smith | F01D 5/28 |
| 2016/0228913 A1* | 8/2016 | Noraas | C08J 9/36 |
| 2016/0230774 A1* | 8/2016 | Whitehurst | F04D 29/324 |
| 2016/0369635 A1* | 12/2016 | Xu | C23C 28/02 |
| 2017/0009592 A1* | 1/2017 | Obuchi | F01D 5/147 |
| 2017/0022826 A1* | 1/2017 | Read | F04D 29/324 |
| 2017/0284422 A1 | 10/2017 | Stieger | |
| 2017/0373612 A1* | 12/2017 | Sellinger | H01L 35/32 |
| 2018/0045216 A1* | 2/2018 | Karlen | F04D 29/023 |
| 2018/0087456 A1 | 3/2018 | Alecu et al. | |
| 2018/0202299 A1* | 7/2018 | Murdock | F04D 29/023 |
| 2018/0257185 A1* | 9/2018 | Onfray | F04D 29/289 |
| 2018/0347442 A1 | 12/2018 | Lacy et al. | |
| 2019/0136697 A1* | 5/2019 | Foster | F01D 25/005 |
| 2019/0360344 A1* | 11/2019 | Ohbo | F04D 29/38 |
| 2020/0032670 A1 | 1/2020 | Morris et al. | |
| 2020/0102835 A1 | 4/2020 | Bryant, Jr. | |
| 2020/0217206 A1 | 7/2020 | Nissen et al. | |
| 2020/0291783 A1* | 9/2020 | Picard | F01D 5/12 |
| 2020/0386159 A1* | 12/2020 | Mizuno | F04D 29/023 |
| 2021/0003016 A1 | 1/2021 | Theertham | |
| 2021/0131286 A1* | 5/2021 | Stilin | F01D 5/147 |

OTHER PUBLICATIONS

Angioni et al., Impact Damage Resistance and Damage Suppression Properties of Shape Memory Alloys in Hybrid Composites—a Review, Smart Materials and Structures, vol. 20, 2011, 24 Pages.

Macromolecular Science & Engineering, Case WesternReserve University, Case School of Engineering. Web Link Only: https://engineering.case.edu/macromolecular-science-and-engineering.

Palacios et al., Rotor Ice Testing of a Centrifugally Powered Pneumatic Deicing System for Helicopter Rotor Blades, Final Report NASA Award No. NNX13AB78A, May 20, 2014, 18 Pages. https://vtol.org/store/product/rotor-ice-testing-of-a-centrifugally-powered-pneumatic-deicing-system-for-helicopter-rotor-blades-9662.cfm.

Thomas, Graphene and the Most Popular Advanced Alloys, AZO Materials, Jan. 28, 2020, 5 pages.

Wang, Ballistic Body Armour Using Shear Thickening Fluids for Enhancing Stab Resistance, The University of Manchester Thesis Paper, 2016, 81 Pages.

* cited by examiner

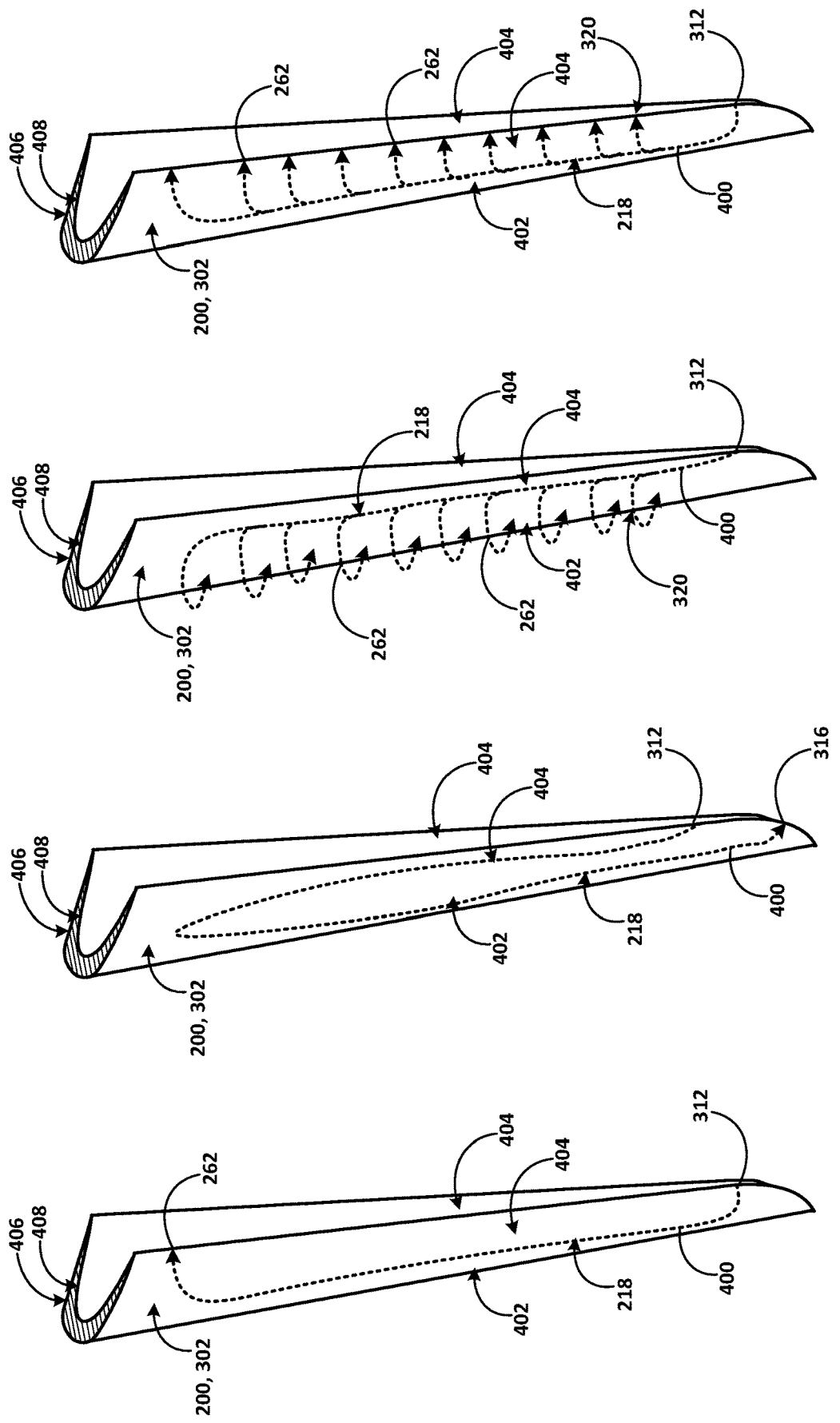

AIRFOILS FOR A FAN SECTION OF A TURBINE ENGINE

FIELD

The present disclosure generally pertains to anti-icing systems for airfoils of a fan section of a turbine engine, such as fan blades and outlet guide vanes. The present disclosure also pertains to airfoils, such as fan blades and outlet guide vanes, for a fan section of a turbine engine, as well as edge guards for such airfoils.

BACKGROUND

Airfoils of a fan section of a turbine engine used to power an aircraft may be prone to icing when exposed to cold intake air. For example, fan blades and/or outlet guide vanes may be prone to icing when exposed to cold intake air and/or bypass air. Accumulation of ice on the fan blades and/or outlet guide vanes may impact the operating performance of the turbine engine.

Additionally, airfoils may be prone to damage when impacted by airborne debris. An airfoil such as a fan blade or an outlet guide vane may have an edge guard attached thereto. Conventional edge guards may have relatively low elasticity and/or ductility. Such edge guards may provide desired protection to the airfoil, but the edge guards may themselves be prone to damage when impacted by airborne debris.

Accordingly, it would be welcomed in the art to provide improved anti-icing systems for airfoils such as fan blades and outlet guide vanes of a turbine engine. Additionally, it would be welcomed in the art to provide improved airfoils for a fan section of a turbine engine, such as improved fan blades, improved outlet guide vanes, and/or improved edge guards attached thereto.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIGS. 4A-4D schematically depict perspective views of exemplary edge guards that may be attached to an airfoil, such as fan blade or an outlet guide vane;

Figure 1:
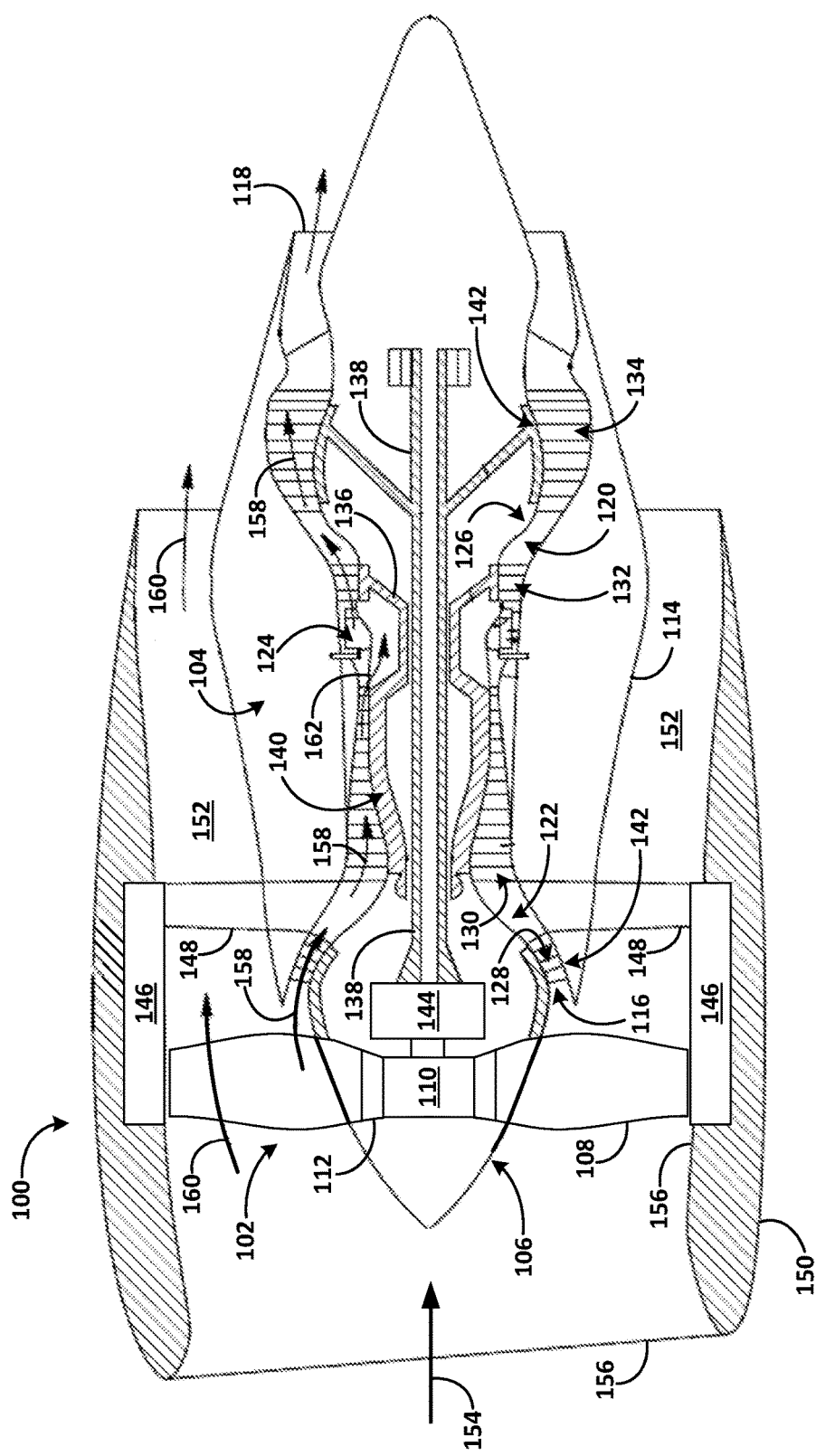
FIG. 1 schematically depicts a cross-sectional view of an exemplary turbine engine.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "upper", "lower", "right", "left", "vertical", "horizontal", "top", "bottom", "lateral", "longitudinal", and so forth, shall relate to the disclosure as it is oriented in the drawing figures. However, it is to be understood that the disclosure may assume various alternative orientations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

The terms "forward" and "aft" refer to relative positions within a turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section 126, and a "high-pressure turbine" may refer to the highest maximum pressure turbine within the turbine section 126.

The term "turbomachine" or "turbomachinery" refers to a machine including one or more compressors, a heat generating section (e.g., a combustor section), and one or more turbines that together generate a torque output.

The present disclosure generally provides airfoils for a fan section of a turbine engine. The airfoils may include fan blades and/or outlet guide vanes. An edge guard may be attached to the respective airfoils. Exemplary edge guards may be formed at least in part of a material that includes a metal alloy and/or of a matrix composite. In some embodiments, the edge guard may provide enhanced physical properties, including enhanced toughness, enhanced flexural modulus, enhanced bulk modulus, enhanced hardness, enhanced elasticity, or enhanced ductility, as well as combinations of these. The combination of one or more enhanced material properties may, individually or together, provide enhanced energy absorption in the event of impacts from airborne debris.

In some embodiments, the presently disclosed edge guards may be formed using additive manufacturing. The edge guards may include an internal lattice structure. The lattice structure may provide enhanced toughness, flexural modulus, bulk modulus, hardness, elasticity, or ductility, as well as combinations of these. Additionally, or in the alternative, the presently disclosed edge guards may comprise a matrix composite, such as a metal matrix composite, a ceramic matrix composite, or a polymer matrix composite. The matrix composite may provide enhanced toughness, flexural modulus, bulk modulus, hardness, elasticity, or ductility, as well as combinations of these. The combination of material properties realized by the presently disclosed edge guards may provide for an enhanced ability to withstand impacts from airborne debris.

Additionally, or in the alternative, in some embodiments, the edge guards may include a heating conduit through which a heating fluid may flow in order to provide anti-icing to the airfoil to which the edge guard is attached. At least a portion of the heating conduit may be defined by an internal lattice structure. A turbine engine may include an anti-icing system that includes a fluid supply pathway configured to supply heating fluid to the respective ones of a plurality of heating conduits disposed within corresponding ones of a plurality of airfoils, such as fan blades or outlet guide vanes. The heating fluid may include bleed air from a core air flowpath of the turbine engine, such as compressor bleed air from a compressor section of the turbine engine.

In some embodiments, the turbine engine may include a geared turbine engine. Such as geared turbine engine may include a core engine and a power gearbox coupling a fan of the turbine engine to a shaft of the core engine. The power gearbox may provide a gear ratio that allows the fan to exhibit a relatively low fan tip speed, such as a fan tip speed that is less than the speed of sound when the turbine engine is operating within at least 80% of a rated speed for the turbine engine. The presently disclosed edge guards may be particularly suitable for turbine engines that have such a relatively low fan tip speed. For example, edge guards formed at least in part of a material that includes that includes a non-metallic material, such as a matrix composite, may be utilized on fan blades of a fan that has a relatively low fan tip speed, reducing rotational weight of the fan while improving strength-to-weight ratio and/or while improving toughness, flexural modulus, bulk modulus, hardness, elasticity, or ductility, as well as combinations of these.

In some embodiments, the airfoils of a fan section may be configured in coordination with the heating conduits within the edge guards to provide enhanced anti-icing properties to the airfoils. Such airfoils and/or edge guards also may be particularly suitable for turbine engines that have such a relatively low fan tip speed. For example, fan blades in a geared turbine engine may have an increased susceptibility to formation and/or accumulation of ice as a result of a relatively low fan tip speed. The presently disclosed fan blades and/or edge guards may provide enhanced anti-icing properties to the fan blades of such a geared turbine engine.

One or more components of the turbomachine engine described herein below may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein may allow for the manufacture of passages, conduits, cavities, openings, casings, manifolds, double-walls, heat exchangers, or other components, or particular positionings and integrations of such components, having unique features, configurations, thicknesses, materials, densities, fluid passageways, headers, and mounting structures that may not have been possible or practical using prior manufacturing methods. Some of these features are described herein.

Suitable additive manufacturing technologies in accordance with the present disclosure include, for example, Selective Laser Melting (SLM), Direct Metal Laser Melting (DMLM), Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), and other known processes.

Suitable powder materials for the manufacture of the structures provided herein as integral, unitary, structures include metallic alloy, polymer, or ceramic powders. Exemplary metallic powder materials are stainless-steel alloys, cobalt-chrome alloys, aluminum alloys, titanium alloys, nickel-based superalloys, and cobalt-based superalloys. In addition, suitable alloys may include those that have been engineered to have good oxidation resistance, known as "superalloys" which have acceptable strength at the elevated temperatures of operation in a turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

Exemplary embodiments of the present disclosure will now be described in further detail. Referring to FIG. 1, an exemplary turbine engine 100 will be described. As used herein, the term "turbine engine" refers to an engine that may include a turbomachine as all or a portion of its power source. Example turbine engines include gas turbine engines, as well as hybrid-electric turbine engines, such as turbofan engines, turboprop engines, turbojet engines, turboshaft engines, and the like. An exemplary turbine engine 100 may be mounted to an aircraft, such as in an under-wing configuration or tail-mounted configuration. It will be appreciated that the turbine engine 100 shown in FIG. 1 is provided by way of example and not to be limiting, and that the subject matter of the present disclosure may be implemented with other suitable types of turbine engines.

In general, a turbine engine 100 may include a fan section 102 and a core engine 104 disposed downstream from the fan section 102. The fan section 102 may include a fan 106 with any suitable configuration, such as a variable pitch, single stage configuration. The fan 106 may include a plurality of fan blades 108 coupled to a fan disk 110 in a spaced apart manner. The fan blades 108 may extend outwardly from the fan disk 110 generally along a radial direction. The fan blades 108 may be rotatable relative to the fan disk 110 about a pitch axis by virtue of the fan blades 108 being operatively coupled to a pitch actuator 112 configured to vary the pitch of the fan blades 108. For example, the pitch actuator 112 may vary the pitch of individual fan blades 108 and/or the pitch actuator 112 may vary the pitch of all or a portion of the fan blades 108, such as in unison with one another. The fan blades 108 may be formed at least in part from a composite material, such as a carbon-fiber material. Additionally, or in the alternative, the fan blades may be formed at least in part from a metallic alloy.

The core engine 104 may be coupled directly or indirectly to the fan section 102 to provide torque for driving the fan section 102. The core engine 104 may include an engine case 114 that encases one or more portions of the core engine 104, including, a compressor section 122, a combustor section 124, and a turbine section 126, in serial flow relationship. The engine case 114 may define a core engine-inlet 116, an exhaust nozzle 118, and a core air flowpath 120 therebetween. The core air flowpath 120 may passing, in serial flow relationship, through the compressor section 122, the combustor section 124, and the turbine section 126, in serial flow relationship. The compressor section 122 may include a first, booster or low pressure (LP) compressor 128 and a second, high pressure (HP) compressor 130. The turbine section 126 may include a first, high pressure (HP) turbine 132 and a second, low pressure (LP) turbine 134. The compressor section 122, combustor section 124, turbine section 126, and exhaust nozzle 118 may be arranged in serial flow relationship and may respectively define a portion of the core air flowpath 120 through the core engine 104.

The core engine 104 and the fan section 102 may be coupled to a shaft driven by the core engine 104. By way of example, as shown in FIG. 1, the core engine 104 may include a high pressure (HP) shaft 136 and a low pressure (LP) shaft 138. The HP shaft 136 may drivingly connect the HP turbine 132 to the HP compressor 130, and the LP shaft 138 may drivingly connect the LP turbine 134 to the LP compressor 128. In other embodiments, a turbine engine 100 may have three shafts, such as in the case of a turbine engine 100 that includes an intermediate pressure turbine. A shaft of the core engine 104, together with a rotating portion of the core engine 104, may sometimes be referred to as a "spool." The HP shaft 136 a rotating portion of the HP compressor 130 coupled to the HP shaft 136, and a rotating portion of the HP turbine 132 coupled to the HP shaft 136, may be collectively referred to as a high pressure (HP) spool 140. The LP shaft 138, a rotating portion of the LP compressor 128 coupled to the LP shaft 138, a rotating portion of the LP turbine 134 coupled to the LP shaft 138, may be collectively referred to as low pressure (LP) spool 142.

In some embodiments, the fan section 102 may be coupled directly to a shaft of the core engine 104, such as directly to an LP shaft 138. Alternatively, as shown in FIG. 1, the fan section 102 and the core engine 104 may be coupled to one another by way of a power gearbox 144, such as a planetary reduction gearbox, an epicyclical gearbox, or the like. For example, the power gearbox 144 may couple the LP shaft 138 to the fan 106, such as to the fan disk 110 of the fan section 102. The power gearbox 144 may include a plurality of gears for stepping down the rotational speed of the LP shaft 138 to a more efficient rotational speed for the fan section 102.

Still referring to FIG. 1, the fan section 102 of the turbine engine 100 may include a fan case 146 that at least partially surrounds the fan 106 and/or the plurality of fan blades 108. The fan case 146 may be supported by the core engine 104, for example, by a plurality of outlet guide vanes 148 circumferentially spaced and extending substantially radially therebetween. The turbine engine 100 may include a nacelle 150 may be secured to the fan case 146. The nacelle 150 may include one or more sections that at least partially surround the fan section 102, the fan case 146, and/or the core engine 104. For example, the nacelle 150 may include a nose cowl, a fan cowl, an engine cowl, a thrust reverser, and so forth. The fan case 146 and/or an inward portion of the nacelle 150 may circumferentially surround an outer portion of the core engine 104. The fan case 146 and/or inward portion of the nacelle 150 may define a bypass passage 152. The bypass passage 152 may be disposed annularly between an outer portion of the core engine 104 and the fan case 146 and/or inward portion of the nacelle 150 surrounding the outer portion of the core engine 104.

During operation of the turbine engine 100, an inlet airflow 154 enters the turbine engine 100 through an inlet 156 defined by the nacelle 150, such as a nose cowl of the nacelle 150. The inlet airflow 154 passes across the fan blades 108. The inlet airflow 154 splits into a core airflow 158 that flows into and through the core air flowpath 120 of the core engine 104, and a bypass airflow 160 that flow through the bypass passage 152. The core airflow 158 is compressed by the compressor section 122. Pressurized from the compressor section 122 flows downstream to the combustor section 124 where fuel is introduced to generate combustion gasses, as represented by arrow 162. The combustion gasses exit the combustor section 124 and flow through the turbine section 126, generating torque that rotates the compressor section to support combustion while also rotating the fan section 102. Rotation of the fan section 102 causes the bypass airflow 160 to flow through the bypass passage 152, generating propulsive thrust. Additional thrust is generated by the core airflow exiting the exhaust nozzle 118.

A bypass ratio may be defined as a ratio between the mass flow rate of airflow through the bypass passage 152 (e.g., the amount of bypass airflow 160) to the mass flow rate of airflow through the core air flowpath 120 (e.g., the amount of core airflow 158). In some embodiments, a turbine engine 100 may exhibit a relatively high bypass ratio. For example, at a rated speed, the bypass ratio may be from about 2:1 to about 20:1, such as from about 6:1 to about 12:1, such as from about 8:1 to about 11:1, or such as from about 12:1 to about 18:1.

During operation of the turbine engine 100, the fan 106 may exhibit a fan tip speed that depends at least in part on the rotational speed of the LP shaft 138 and/or a gear ratio of the power gearbox 144. In some embodiments, the power gearbox 144 may have a gear ratio that allows the fan 106 to exhibit a relatively low fan tip speed, such as a fan tip speed that is less than the speed of sound, for example, when the turbine engine 100 is operating at or near a rated speed. For example, the power gearbox 144 may have a gear ratio between the LP shaft 138 and the fan 106 from about 1:2 to about 1:6, such as from about 1:2 to about 1:5, or such as from about 1:3 to about 1:4. As used herein, the term "tip speed" or "fan tip speed" refers to a linear speed of an outer tip of a fan blade 108 during operation of the fan 106. As used herein, the term "rated speed" refers to a maximum rotational speed that a turbine engine 100 may achieve while operating properly. For example, a turbine engine 100 may be operating at the rated speed during maximum load operations, such as during takeoff operations.

An anti-icing system may be beneficial for any fan section 102 of a turbine engine 100. In some embodiments, an anti-icing system may be particularly beneficial for fan sections that have a fan tip speed that is less than about 1,000 meters per second (m/s). For example, a turbine engine 100 may include a power gearbox 144 that has a gear ratio that allows the fan 106 to exhibit a fan tip speed that is less than the speed of sound (e.g., 343 meters per second in dry air at 20° C.) when the turbine engine 100 is operating within at least about 80% of the rated speed, such as at least about 90% of the rated speed, or such as at about 100% of the rated speed. In other embodiments, the fan tip speed may be greater than the speed of sound. Additionally, or in the alternative, the power gearbox 144 may have a gear ratio that allows the fan 106 to exhibit a fan tip speed, when the turbine engine is operating at the rated speed, of from about 250 m/s to about 450 m/s, such as from about 250 m/s to about 350 m/s, or such as from about 300 m/s to about 343 m/s. When the turbine engine is operating at the rated speed, the fan tip speed may be less than 343 m/s, such as less than 340 m/s such as less than 320 m/s, or such as less than 300 m/s. In still further embodiments, a turbine engine 100 may be configured to rotate the fan section 102, with or without a power gearbox 144, at a speed such that the fan blades 108 may exhibit a relatively high fan tip speed, such as a fan tip speed that exceeds the speed of sound when the turbine engine is operating at the rated speed. For example, when the turbine engine is operating at the rated speed for the turbine engine 100, the fan tip speed may be from about 350 m/s to about 1,000 m/s, such as from about 350 m/s to about 700 m/s, such as from about 450 m/s to about 600 m/s, such as from about 500 m/s to about 650 m/s, such as from about 600 m/s to about 1,000 m/s, or such as from about 800 m/s to about 1,000 m/s.

During operation of the turbine engine 100, the fan 106 may exhibit a fan pressure ratio that depends at least in part on the tip speed of the fan blades 108. As used herein, the term "fan pressure ratio" refers to a ratio of an air pressure immediately downstream of the fan blades 108 during operation of the fan 106 to an air pressure immediately upstream of the fan blades 108 during operation of the fan 106. In some embodiments, the fan 106 may exhibit a relatively low fan pressure ratio during operation of the turbine engine 100 at a rated speed. For example, the fan 106 may exhibit a relatively high fan tip speed together with a relatively low fan pressure ratio, or a relatively low fan tip speed together with a relatively low fan pressure ratio. For example, the turbine engine 100 may define a fan pressure ratio of from about 1.2 to about 1.7, such as from about 1.3 to about 1.6, or such as from about 1.4 to about 1.5. The fan pressure ratio may be less than or equal to about 1.5, such as less than or equal to about 1.4. The fan pressure ratio may be determined at a rated speed for the turbine engine 100.

In some exemplary embodiments, the turbine engine 100 may be a relatively large power class turbine engine 100 that may generate a relatively large amount of thrust when operated at the rated speed. For example, the turbine engine 100 may be configured to generate from about 300 Kilonewtons (kN) of thrust to about 700 kN of thrust, such as from about 300 kN to about 500 kN of thrust, such as from about 500 kN to about 600 kN of thrust, or such as from about 600 kN to about 700 kN of thrust. However, it will be appreciated that the various features and attributes of the turbine engine 100 described with reference to FIG. 1 are provided by way of example only and not to be limiting. In fact, the present disclosure may be implemented with respect to any desired turbine engine, including those with attributes or features that differ in one or more respects from the turbine engine 100 described herein.

Figure 2:
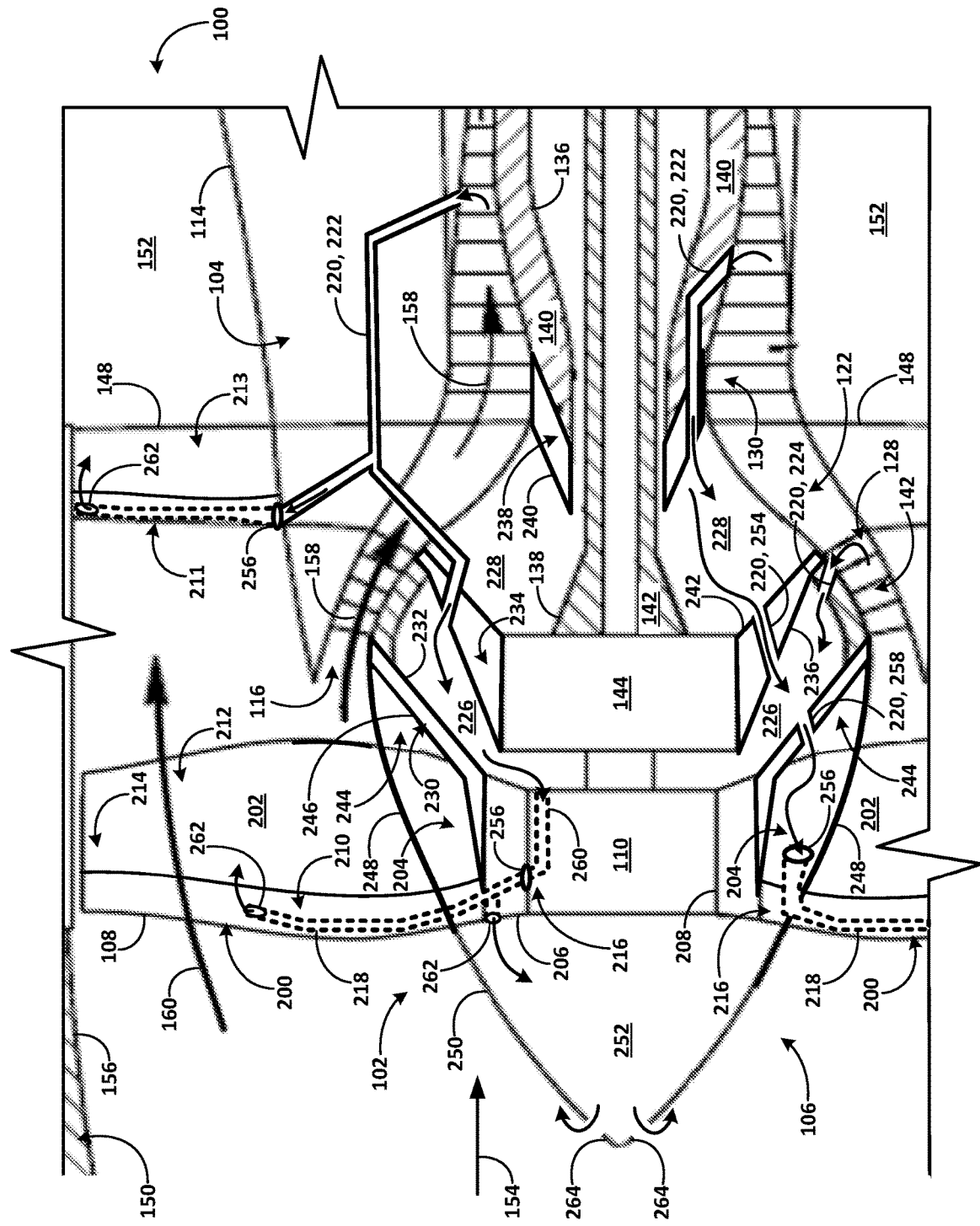
FIG. 2 schematically depicts an enlarged cross-sectional view of an exemplary turbine engine that includes an anti-icing system.

Now referring to FIG. 2, an exemplary fan section 102 of a turbine engine 100 is further described. The fan section 102 may include a plurality of fan blades 108 that have an edge guard 200 attached thereto. Additionally, or in the alternative, the fan section 102 may include a plurality of outlet guide vanes 148 that have an edge guard 200 attached thereto. The edge guards 200 may provide protection from damage, such as from impacts, erosion, and the like. Additionally, or in the alternative, the edge guards 200 may be configured to provide anti-icing. An edge guard 200 may be formed at least in part using an additive manufacturing technology, using any suitable metal alloy or non-metallic material, such as those described herein.

The respective fan blades 108 may include a working region 202, a root region 204, and a dovetail region 206. The dovetail region 206 may be configured to engage with a dovetail slot 208 of a fan disk 110. The respective fan blades 108 have a forward portion 210 that is generally oriented axially forward relative to a longitudinal axis of the turbine engine 100, such as towards an inlet airflow 154 that enters the turbine engine 100. The fan blades 108 have a rearward portion 212 that is generally oriented axially aft relative to the forward portion 210 of the fan blade 108, and/or relative to the longitudinal axis of the turbine engine 100. The rearward portion 212 of a fan blade 108 may be generally oriented downstream relative to the inlet airflow 154 that enters the turbine engine 100. The fan blades 108 have a tip portion 214 that generally includes a radially outward portion of the fan blade 108. An edge guard 200 may be attached to at least part of a forward portion 210 of a fan blade 108, at least part of a rearward portion 212 of the fan blade 108, and/or at least part of a tip portion 214 of the fan blade 108.

As shown in FIG. 2, the fan blades 108 include an edge guard 200 attached to at least part of the forward portion 210 of the respective fan blades 108. In some embodiments, an edge guard 200 may be attached to at least part of a forward portion 210 and a tip portion 214 of the fan blade 108. Additionally, or in the alternative, an edge guard 200 may be attached to at least part of a tip portion 214 and a rearward portion 212 of the fan blade 108, at least part of a forward portion 210 and a rearward portion 212 of the fan blade 108, and/or at least part of a forward portion 210, a tip portion 214, and a rearward portion 212 of the fan blade 108. An edge guard 200 may cover at least a portion of the working region 202, such as a forward portion 210 of the working region 202. Additionally, or in the alternative, an edge guard 200 may cover at least part of a rearward portion 212 of the working region 202, and/or at least part of a tip portion 214 of the working region 202. An edge guard 200 and/or a portion of an edge guard 200 that is attached to a forward portion 210 of the fan blade 108 may sometimes be referred to as a forward edge guard. An edge guard 200 and/or a portion of an edge guard 200 that is attached to a rearward portion 212 of the fan blade 108 may sometimes be referred to as a rearward-edge guard. An edge guard 200 and/or a portion of an edge guard 200 that is attached to a tip portion 214 of the fan blade 108 may sometimes be referred to as a tip-edge guard.

The fan section 102 may include any suitable number of fan blades 108, such as from eight (8) to forty (40) fan blades 108, such as from eight (8) to eighteen (18) fan blades 108, such as from twelve (12) to twenty (20) fan blades 108, such as from fourteen (14) to twenty-four (24) fan blades 108, or such as from twenty-two (22) to thirty (30) fan blades 108. In some embodiments, the fan section 102 may include twenty-two (22) or fewer fan blades 108, such as eighteen (18) or fewer fan blades 108, such as sixteen (16) or fewer fan blades 108, or such as fourteen (14) or fewer fan blades 108. Each respective fan blade 108 may include an edge guard 200. The respective edge guards 200 may include one or more portions. In exemplary embodiments, the edge guard 200 or at least a portion of the edge guard 200 may have a monolithic structure.

In addition, or in the alternative to an edge guard 200 being attached to respective fan blades 108, an edge guard 200 may be attached to respective ones of a plurality of outlet guide vanes 148. The respective outlet guide vanes 148 have a forward portion 211 that is generally oriented axially forward relative to a longitudinal axis of the turbine engine 100, such as towards an inlet airflow 154 that enters the turbine engine 100. The outlet guide vanes 148 have a rearward portion 213 that is generally oriented axially aft relative to the forward portion 211 of the outlet guide vanes 148, and/or relative to the longitudinal axis of the turbine engine 100. The rearward portion 213 of an outlet guide vane 148 may be generally oriented downstream relative to the inlet airflow 154 that enters the turbine engine 100.

As shown in FIG. 2, the outlet guide vanes 148 may include an edge guard 200 attached to at least part of the forward portion 211 of the respective outlet guide vane 148. Additionally, or in the alternative, the outlet guide vanes 148 may include an edge guard 200 attached to at least part of a rearward portion 213 of the outlet guide vane 148. An edge guard 200 that is attached to a forward portion 211 of the outlet guide vane 148 may sometimes be referred to as a forward edge guard. An edge guard 200 that is attached to a rearward portion 213 of the outlet guide vane 148 may sometimes be referred to as a rearward-edge guard.

Still referring to FIG. 2, the turbine engine 100 may include an anti-icing system 216. The anti-icing system 216 may provide a flow of heating fluid to a plurality of fan blades 108. The heating fluid may flow through the fan blades 108 and/or through the edge guards 200 attached thereto, heating the fan blades 108 and/or the edge guards 200 and thereby reducing a tendency for ice to form and/or accumulate on the fan blades 108 and/or on the edge guards 200 attached thereto. Additionally, or in the alternative, the anti-icing system 216 may provide a flow of heating fluid to a plurality of outlet guide vane 148. The heating fluid may flow through the outlet guide vane 148 and/or through the edge guards 200 attached thereto, heating the fan blades 108 and/or the edge guards 200 and thereby reducing a tendency for ice to form and/or accumulate on the outlet guide vanes 148 and/or on the edge guards 200 attached thereto.

The heating fluid may flow through a heating conduit 218 disposed within at least a portion of the edge guard 200 attached to a respective fan blade 108. Additionally, or in the alternative, the heating fluid may flow through a heating conduit 218 disposed within at least a portion of the edge guard 200 attached to a respective outlet guide vane 148. The heating conduit 218 may be defined at least in part by an internal structure of the edge guard 200. For example, at least a portion of the edge guard 200 may have a monolithic structure and internal portion of the monolithic structure of the edge guard 200 may define at least a portion of the heating conduit 218. The anti-icing system 216 may include one or more fluid supply pathways 220 configured to supply heating fluid to the heating conduits 218. By way of example, a plurality of fluid supply pathways 220 are depicted in FIG. 2. An exemplary turbine engine 100 may include one or more of the fluid supply pathways 220 described with reference to FIG. 2. The one or more fluid supply pathways 220 may be defined at least in part by a conduit, channel, tube, or the like. Additionally, or in the alternative, the one or more fluid supply pathways 220 may be defined at least in part by one or more portions of the turbine engine 100, such as one or more engine cases, fan cases, spools, housings, or the like. It will be appreciated that a turbine engine 100 need not include each particular one of the example fluid supply pathways 220 depicted in FIG. 2, and that other fluid supply pathways 220 are contemplated. The scope of present disclosure embraces any fluid supply pathway 220 configured to supply heating fluid to the heating conduits 218 of the respective fan blades 108.

In some embodiments, the heating fluid may include bleed air from the core air flowpath 120, such as compressor bleed air. As shown in FIG. 2, one or more fluid supply pathways 220 may provide a flow of compressor bleed air, such as from the core air flowpath 120 at one or more portions of the compressor section 122 and/or from one or more bleed lines fluidly communicating with the core air flowpath 120 at one or more portions of the compressor section 122. For example, the one or more fluid supply pathways 220 may fluidly communicate with the core air flowpath 120 at one or more stages of the HP compressor 130. By way of example, heating fluid may be supplied to heating conduits 218 within a plurality of edge guards 200 by one or more HP compressor bleed air conduits 222 in fluid communication with the core air flowpath 120 at one or more stages of the HP compressor 130. For example, one or more HP compressor bleed air conduits 222 may supply heating fluid to heating conduits 218 within a plurality of edge guards 200 attached to a corresponding plurality of fan blades 108. Additionally, or in the alternative, one or more HP compressor bleed air conduits 222 may supply heating fluid to heating conduits 218 within a plurality of edge guards 200 attached to a corresponding plurality of outlet guide vanes 148. The one or more HP compressor bleed air conduits 222 may pass through at least a portion of the engine case 114, and/or the one or more HP compressor bleed air conduits 222 may be defined at least in part by the engine case 114. Additionally, or in the alternative, an HP compressor bleed air conduit 222 may pass through at least a portion of the HP spool 140, and/or the HP compressor bleed air conduit 222 may be defined at least in part by the HP spool 140.

In addition, or in the alternative, to heating fluid being supplied by an HP compressor bleed air conduit 222, heating fluid may be supplied by an LP compressor bleed air conduit 224 in fluid communication with the core air flowpath 120 at one or more stages of the LP compressor 128. An LP compressor bleed air conduit 224 may pass through at least a portion of the engine case 114, and/or the HP compressor bleed air conduit 222 may be defined at least in part by the engine case 114. Additionally, or in the alternative, an LP compressor bleed air conduit 224 may pass through at least a portion of the LP spool 142 and/or the LP compressor bleed air conduit 224 may be defined at least in part by the LP spool 142.

In some embodiments, heating fluid, such as compressor bleed air from the core air flowpath 120 at the HP compressor 130 and/or at the LP compressor 128 may flow through a forward compressor plenum 226 and/or an aft compressor plenum 228. A forward compressor plenum 226 may include a pressurized volume that has a generally annular shape defined at least in part by a fan frame 230, such as an aft fan frame wall 232. The fan frame 230 and/or the aft fan frame wall 232 may define at least a portion of a support structure for the fan disk 110. Additionally, or in the alternative, the fan frame 230 and/or the aft fan frame wall 232 may define at least a portion of a bearing support, disk, hub, housing, or casing, of the fan disk 110, as well as combinations of these. The forward compressor plenum 226 may additionally or alternatively be defined at least in part by an LP spool frame 234, such as a forward LP spool frame wall 236. The LP spool frame 234 and/or the forward LP spool frame wall 236 may define at least a portion of a support structure for the LP spool 142. Additionally, or in the alternative, the LP spool frame 234 and/or the forward LP spool frame wall 236 may define at least a portion of a support structure for the power gearbox 144. The LP spool frame 234 and/or the forward LP spool frame wall 236 may additionally or alternatively define at least a portion of a bearing support, disk, hub, housing, or casing, of the LP spool frame 234 and/or the power gearbox 144, as well as combinations of these. The forward compressor plenum 226 may be pressurized at least in part by the heating fluid, such as the compressor bleed air. An aft compressor plenum 228 may include a pressurized volume that has a generally annular shape defined at least in part by an HP spool frame 238, such as forward HP spool frame wall 240. The HP spool frame 238 and/or the forward HP spool frame wall 240 may define at least a portion of a support structure for the HP spool 140. Additionally, or in the alternative, HP spool frame 238 and/or the forward HP spool frame wall 240 may define at least a portion of a bearing support, disk, hub, housing, or casing, of the HP spool frame 238, as well as combinations of these. The aft compressor plenum 228 may additionally or alternatively be defined at least in part by the LP spool frame 234, such as an aft LP spool frame wall 242. The aft compressor plenum 228 may be pressurized at least in part by the heating fluid, such as the compressor bleed air. The aft compressor plenum 228 may have a pressure that is greater than the forward compressor plenum 226, for example, such that heating fluid may flow from the aft compressor plenum 228 to the forward compressor plenum 226.

In addition, or in the alternative, to the heating fluid flowing through a forward compressor plenum 226 and/or an aft compressor plenum 228, the heating fluid, such as compressor bleed air, may flow through a fan frame plenum 244. The fan frame plenum 244 may include a pressurized volume that has a generally annular shape defined at least in part by a fan frame 230, such as forward fan frame wall 246. The fan frame plenum 244 may additionally or alternatively be defined at least in part by a plurality of blade platforms 248 and/or at least in part by a nose cone 250. The fan frame plenum 244 may be pressurized at least in part by the heating fluid, such as the compressor bleed air. The fan frame plenum 244 may have a pressure that is greater than the forward compressor plenum 226, for example, such that heating fluid may flow from the forward compressor plenum 226 to the fan frame plenum 244. The nose cone 250 may define a nose plenum 252. The nose plenum 252 may fluidly communicate with the fan frame plenum 244. The nose plenum 252 may be pressurized at least in part by the heating fluid, such as heating fluid that flows through the heating conduits 218 within the edge guards 200. The nose plenum 252 may have a pressure that is greater than the fan frame plenum 244, for example, such that heating fluid may flow from the fan frame plenum 244 to the nose plenum 252, such as through the heating conduits 218 within the edge guards 200.

Still referring to FIG. 2, in some embodiments, heating fluid such as compressor bleed air may flow through an HP compressor bleed air conduit 222 and into an aft compressor plenum 228. Heating fluid in the aft compressor plenum 228 may flow through a fluid supply pathway 220 that provides fluid communication between the aft compressor plenum 228 and a forward compressor plenum 226. For example, the heating fluid may flow through one or more LP spool frame-conduits 254 fluidly communicating with the aft compressor plenum 228 and a forward compressor plenum 226. The one or more LP spool frame-conduits 254 may pass through at least a portion of the LP spool frame 234, and/or the one or more LP spool frame-conduits 254 may be defined at least in part by the LP spool frame 234. Additionally, or in the alternative, a compressor bleed air conduit 222 may supply compressor bleed air to the forward compressor plenum 226.

Heating fluid, such as heating fluid in the forward compressor plenum 226, may flow into the heating conduits 218 within the respective edge guards 200 corresponding to the respective fan blades 108. The respective fan blades 108 may include one or more heating fluid inlets 256. The one or more heating fluid inlets 256 may fluidly communicate with one or more of the respective heating conduits 218 within the edge guards 200 attached to corresponding fan blades 108. The one or more heating fluid inlets 256 may be defined at least in part by a structure of the respective fan blade 108, such as a root region 204, a dovetail region 206, and/or a working region 202, of the fan blade 108. Additionally, or in the alternative, heating fluid in the forward compressor plenum 226 may flow into the fan frame plenum 244, such as through a fluid supply pathway 220 that provides fluid communication between the forward compressor plenum 226 and the fan frame plenum 244. For example, the heating fluid may flow through a fan frame-conduit 258 fluidly communicating with the forward compressor plenum 226 and the fan frame plenum 244. The fan frame-conduit 258 may pass through at least a portion of the fan frame 230, and/or the fan frame-conduit 258 may be defined at least in part by the fan frame 230.

In some embodiments, the heating fluid inlets 256 may provide fluid communication between the forward compressor plenum 226 and the heating conduits 218 within the respective edge guards 200 corresponding to the respective fan blades 108. For example, the heating fluid inlet 256 may be disposed within and/or defined by a structure of a dovetail region 206 of the fan blade 108. The dovetail region 206 of the respective fan blades 108 may interfaces with a corresponding dovetail slot 208 of the fan disk 110. The heating fluid inlets 256 disposed within the dovetail region 206 of a fan blade 108 may provide fluid communication with the forward compressor plenum 226, for example by way of a corresponding fan disk-conduit 260. For example, a plurality of fan disk-conduits 260 may be disposed within and/or defined by a structure of at least a portion of the fan disk 110 and/or the plurality of fan disk-conduits 260 may be defined at least in part by the fan disk 110, such as a radially inward portion and/or an axially aft portion of the fan disk 110. Additionally, or in the alternative, the heating fluid inlets 256 may provide fluid communication between the fan frame plenum 244 and the heating conduits 218 within the respective edge guards 200 corresponding to the respective fan blades 108. For example, the heating fluid inlet 256 may be disposed within and/or defined by a structure of a root region 204 of the fan blade 108. The root region 204 may include a proximal region of the fan blade 108 located between the dovetail region 206 and the blade platform 248. The one or more heating fluid inlets 256 passing through the root region 204 of a fan blade 108 may provide fluid communication with the fan frame plenum 244.

Heating fluid that flows through the heating conduits 218 within the edge guards 200 corresponding to the respective fan blades 108 may exit the respective heating conduit 218 though one or more heating fluid outlets 262. The one or more heating fluid outlets 262 may be defined at least in part by a structure of the edge guard 200, such as by a monolithic structure of the edge guard 200. The one or more heating fluid outlets 262 may discharge heating fluid to a down-pressure location. The down-pressure location may include any suitable location that has a pressure that is sufficiently less than the pressure at the corresponding heating fluid inlet 256, for example, such that suitable flow rate of heating fluid through the heating conduit 218 may be attained. In some embodiments, one or more heating fluid outlets 262 may be located about a portion of the edge guard adjacent to a working region 202 of the respective fan blade 108. Additionally, or in the alternative, the one or more heating fluid outlets 262 may be located about a working region of the fan blade 108, such that heating fluid may flow through a conduit within a portion of the working region 202 of the fan blade 108 in fluid communication with the one or more heating fluid outlets 262. The heating fluid may discharge from one or more heating fluid outlets 262 to an inlet 156 of the turbine engine 100 defined by the nacelle 150 and/or to a core engine-inlet 116 and/or a bypass passage 152 of the turbine engine 100. At least a portion of the heating fluid may define a boundary layer across a surface of the fan blade 108 until mixing with an inlet airflow 154, the core airflow 158, and/or the bypass airflow 160. Additionally, or in the alternative, the one or more heating fluid outlets 262 may be located about a root region 204 and/or a dovetail region 206 of the fan blade 108. The heating fluid may discharge from one or more heating fluid outlets 262 located about a root region 204 and/or a dovetail region 206 of the fan blade 108 to a nose plenum 252. Heating fluid that flows into the nose plenum 252 may flow through one or more nose plenum-outlets 264, where the heating fluid may define a boundary layer across a surface of the nose cone 250 until mixing with an inlet airflow 154, the core airflow 158, and/or the bypass airflow 160.

With respect to edge guards 200 attached to outlet guide vanes 148, heating fluid from a fluid supply pathway 220, such as an HP compressor bleed air conduit 222, may flow into the heating conduits 218 within the respective edge guards 200. The respective outlet guide vanes 148 may include one or more heating fluid inlets 256 in fluid communication with the fluid supply pathway 220 and the heating conduits 218 within the respective edge guards 200. Heating fluid that flows through the heating conduits 218 within the edge guards 200 corresponding to the respective outlet guide vanes 148 may exit the respective heating conduit 218 though one or more heating fluid outlets 262 defined by the edge guard 200 and/or by the outlet guide vane 148. The one or more heating fluid outlets 262 may discharge heating fluid to a down-pressure location, such as the bypass passage 152. The down-pressure location may include any suitable location that has a pressure that is sufficiently less than the pressure at the corresponding heating fluid inlet 256, for example, such that suitable flow rate of heating fluid through the heating conduit 218 may be attained.

Referring now to FIGS. 3A and 3B, and FIGS. 3C and 3D, exemplary airfoils 300, such as fan blades 108 or outlet guide vanes 148, are further described. As shown in FIGS. 3A-3D, an airfoil 300 may include an airfoil body 304 and an edge guard 200, such as a forward-edge guard 302. The forward-edge guard 302 may be disposed about a forward portion 210 of the airfoil 300, such as a forward portion 210 of a fan blade 108. An edge guard 200 may be attached to an airfoil body 304 by an adhesive layer 306. Additionally, or in the alternative, an edge guard 200 may be attached to an airfoil body 304 by any suitable technology, such as co-molding, welding, shrink fitting, mechanical fastening, and the like. While the airfoils 300 shown in FIGS. 3A-3D include an edge guard 200 configured and arranged as a forward-edge guard 302, it will be appreciated that the edge guard 200 may additionally or alternatively include, and/or may be configured as, a rearward-edge guard and/or a tip-edge guard. Additionally, while FIGS. 3A-3D respectively show an edge guard 200 in relation to a fan blade 108, it will be appreciated that an edge guard 200 may be provided in relation to an outlet guide vane 148 with a configuration substantially as shown in, and/or as described with reference to, FIGS. 3A-3D.

The edge guard 200 may have any desired shape and dimensions. In some embodiments, the edge guard 200 may have dimensions that correspond to dimensions of an edge 308 of the airfoil body 304. The edge guard 200 may have a contour or profile that follows a shape of the edge 308 of the airfoil body 304. Additionally, or in the alternative, a contour of the edge guard 200 may differ from a contour of the airfoil body 304. For example, the edge guard 200 may include an aerodynamic contour that differs from a contour of the airfoil body 304. An edge guard 200 may have a thickness, as measured at the thickest point of the edge guard 200, of from about 1 millimeter (mm) to about 10 centimeters (cm), such as from about 1 mm to about 10 mm, such as from about 1 cm to about 5 cm, or such as from about 1 cm to about 10 cm. An edge guard 200 may have a length that extends along all or a portion of an edge 308 of an airfoil body 304. For example, an edge guard 200 may have a length, as measured along one edge 308 of the edge guard 200, of from about 10 centimeters (cm) to about 200 cm, such as from about 25 cm to about 50 cm, such as from about 50 cm to about 100 cm, such as from about 100 cm to about 160 cm, or such as from about 120 cm to about 150 cm, or such as from about 150 cm to about 200 cm.

The adhesive layer 306 may include one or more thermoplastic materials, one or more thermosetting materials, or the like. The adhesive layer 306 may be provided in the form of a fluid medium, a film, or other suitable medium. The adhesive layer 306 may cure by any suitable mechanism, including heat curing, moisture curing, UV curing, catalytic curing, or the like. The airfoil body 304 may include an edge 308, about which the edge guard 200 may be disposed. In some embodiments, at least a portion of the edge 308 may define a blade-adhesion region that has surface properties selected to enhance bonding with the adhesive layer 306. Additionally, or in the alternative, the edge guard 200, such as the forward-edge guard 302, may include a guard-adhesion region 310 that has surface properties selected to enhance bonding with the adhesive layer 306. Such surface properties of the edge 308 of the airfoil body 304, such as the blade-adhesion region disposed about the edge 308 of the airfoil body 304, and/or such surface properties of the guard-adhesion region 310, may include void spaces, pores, a surface treatment, or the like. Such surface treatment may include a mechanical surface treatment or a chemical surface treatment. The particular surface treatment may be selected based at least in part on the composition of the airfoil body 304, the composition of the edge guard 200, and/or the composition of the adhesive layer 306. In some embodiments, the adhesive layer 306 may at least partially impregnate void spaces, pores, or the like in the airfoil body 304 and/or in the edge guard 200.

Figure 3B:
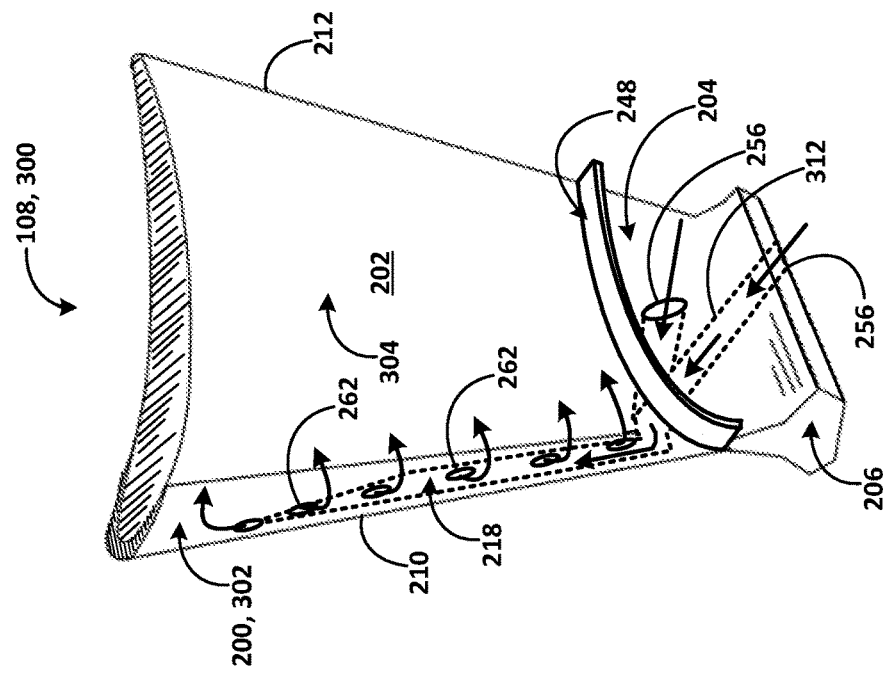
FIGS. 3A and 3B schematically depict an exploded perspective view and an assembled perspective view, respectively, of an exemplary airfoil, such as a fan blade, that may be included in a fan section of a turbine engine.
Figure 3A:
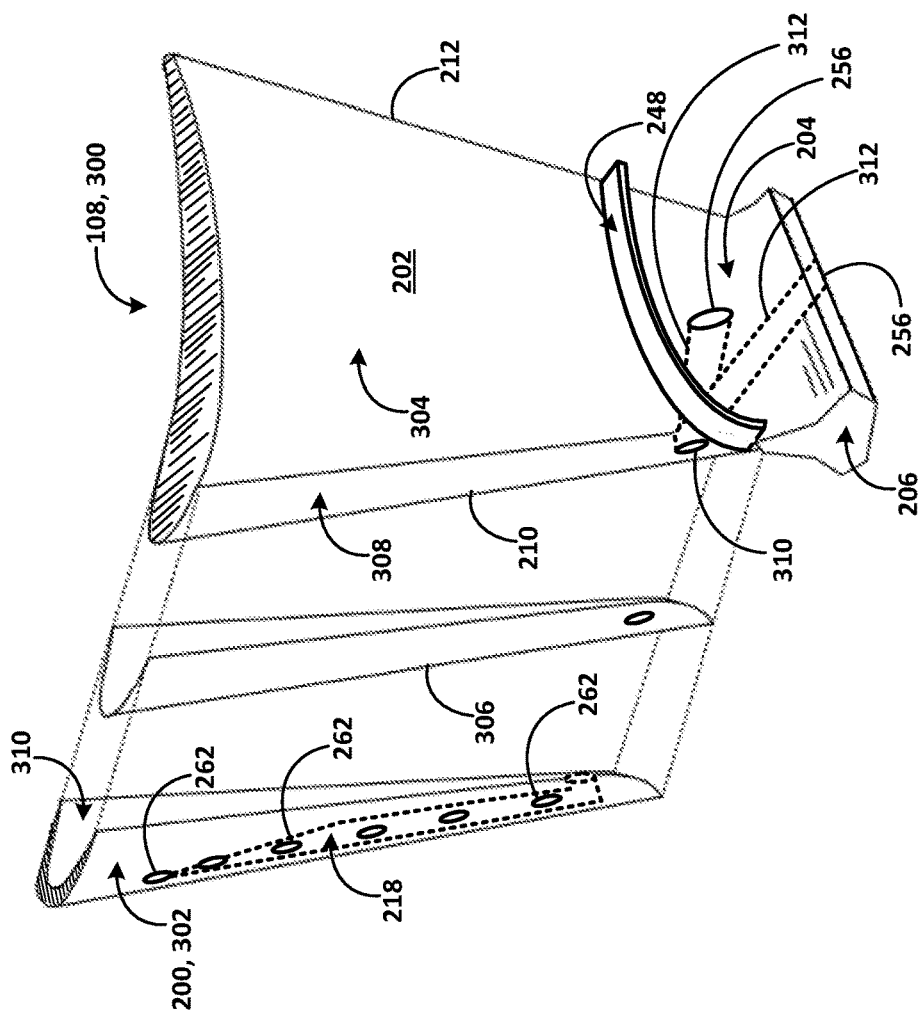
Figure 3D:
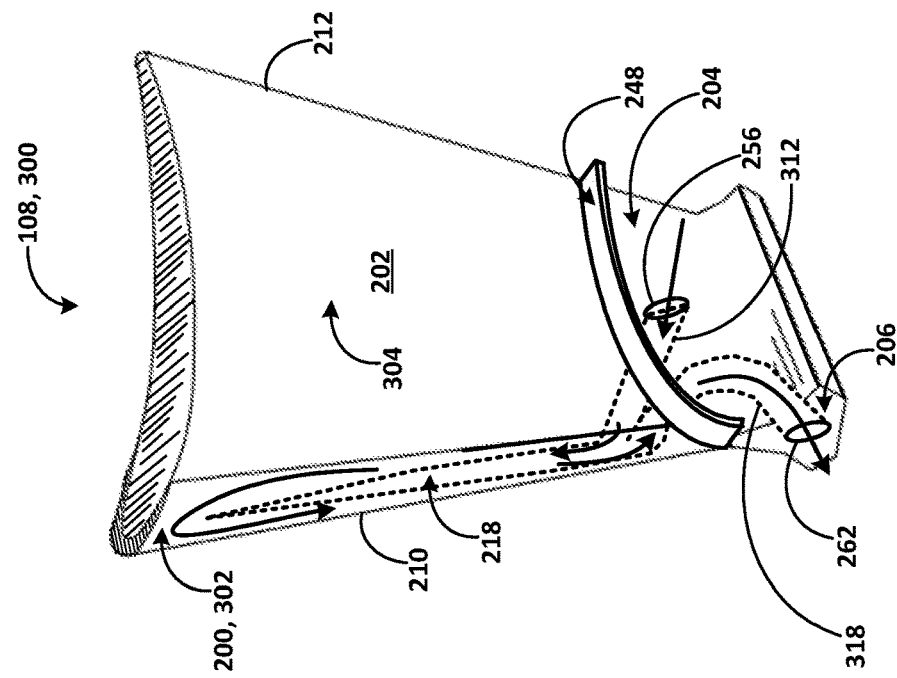
FIGS. 3C and 3D schematically depict an exploded perspective view and an assembled perspective view, respectively, of another exemplary airfoil, such as a fan blade that may be included in a fan section of a turbine engine.
Figure 3C:
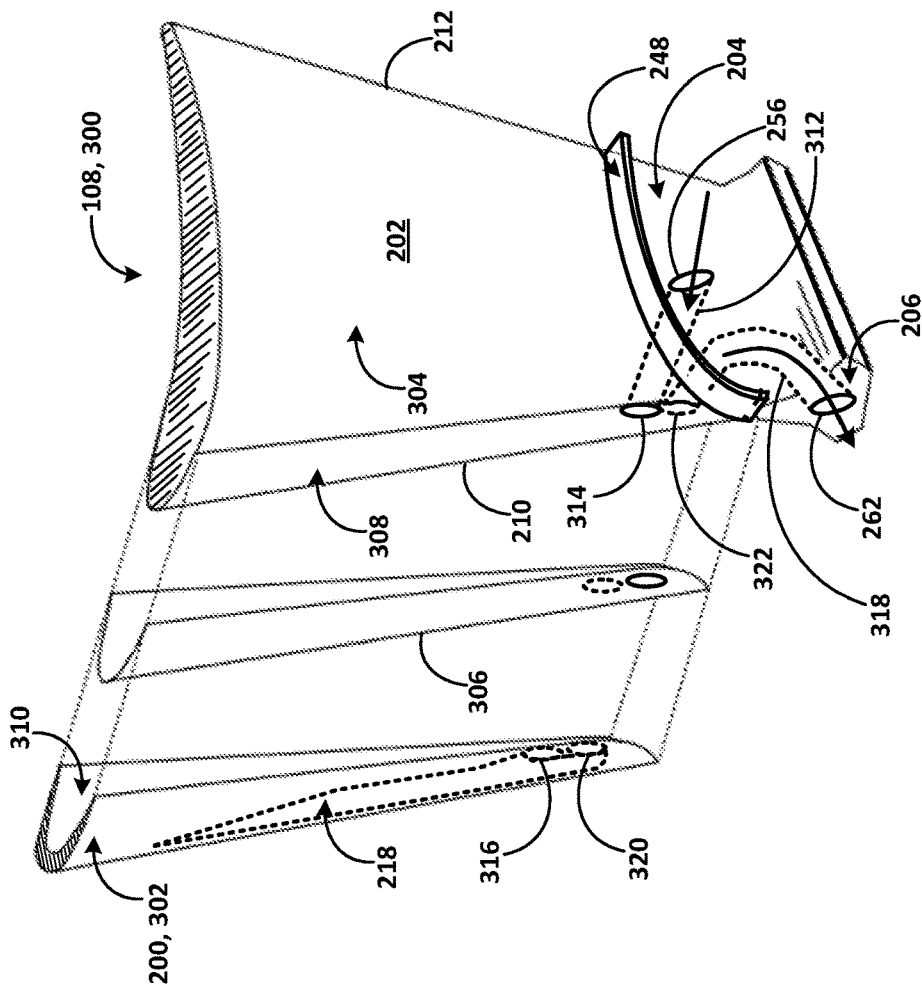
Figure 5B:
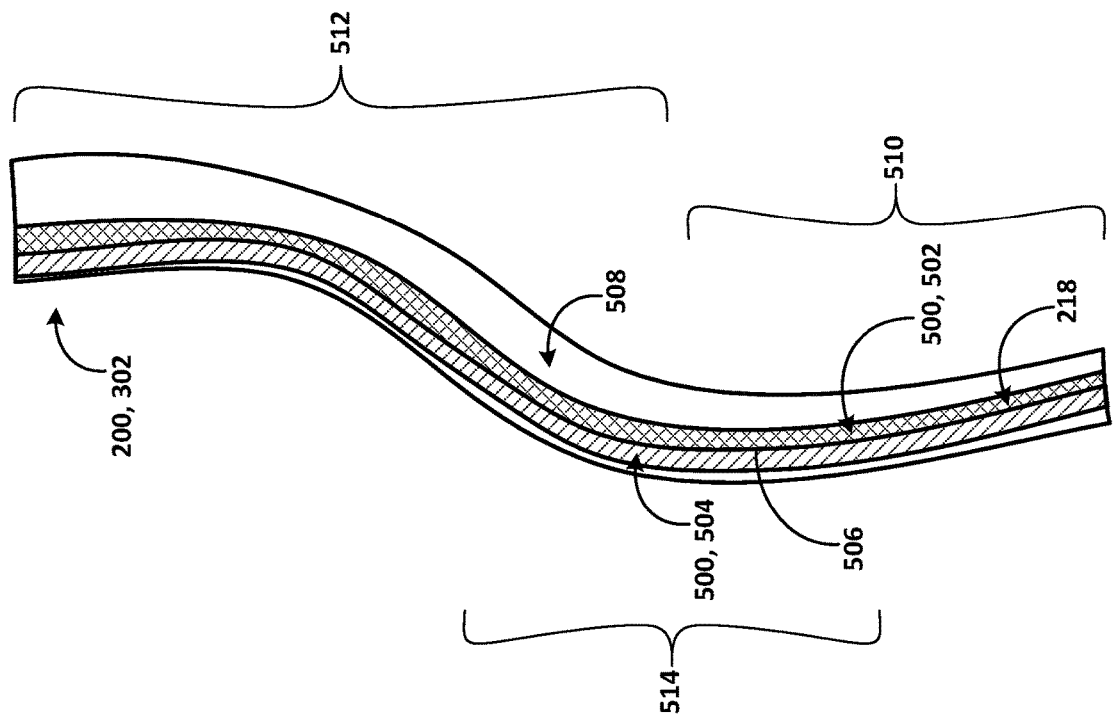
FIGS. 5A-5D schematically depict perspective views of further exemplary edge guards that may be attached to an airfoil, such as a fan blade or an outlet guide vane.
Figure 5A:
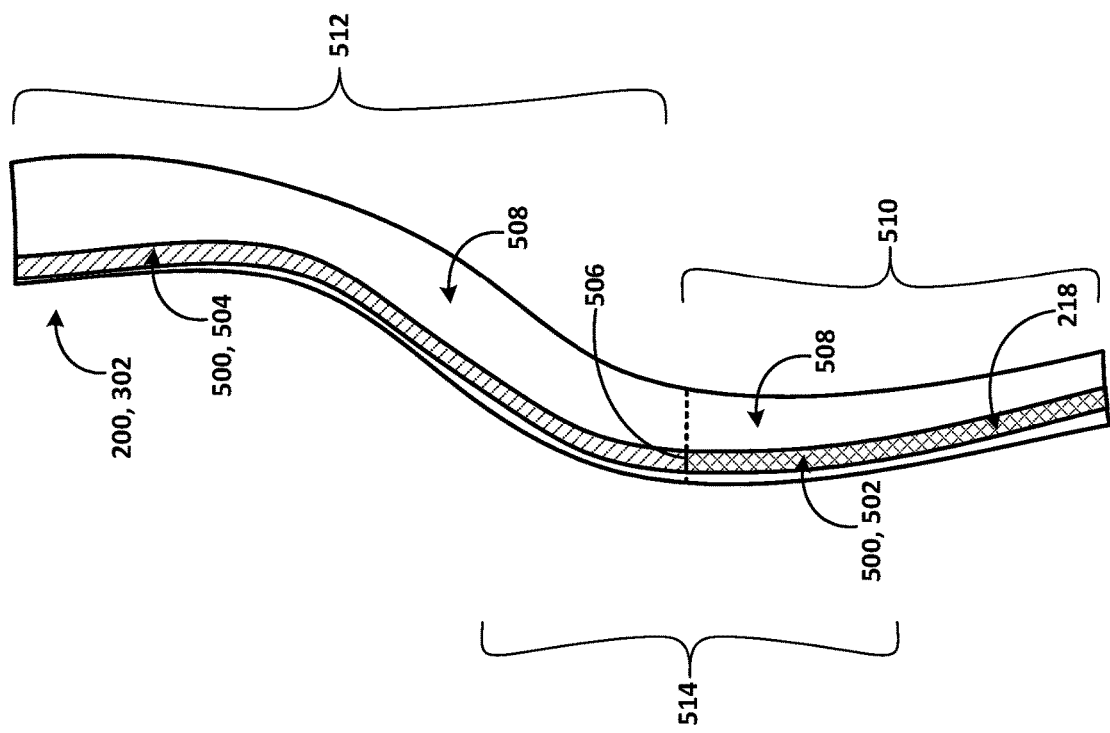
Figure 5D:
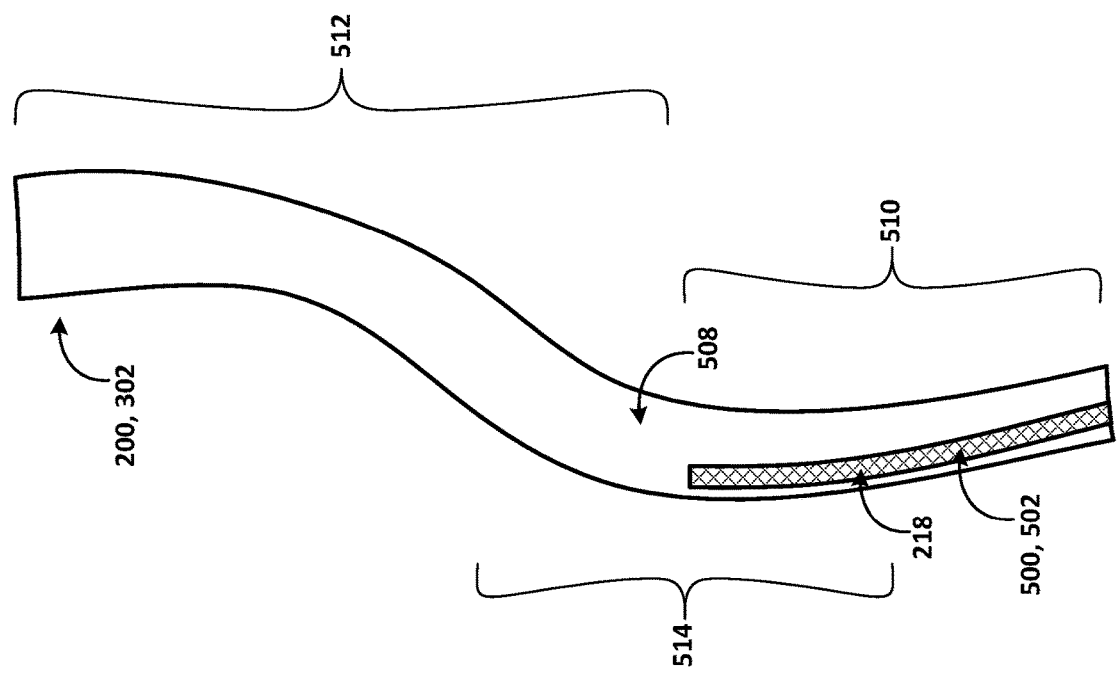
Figure 5C:
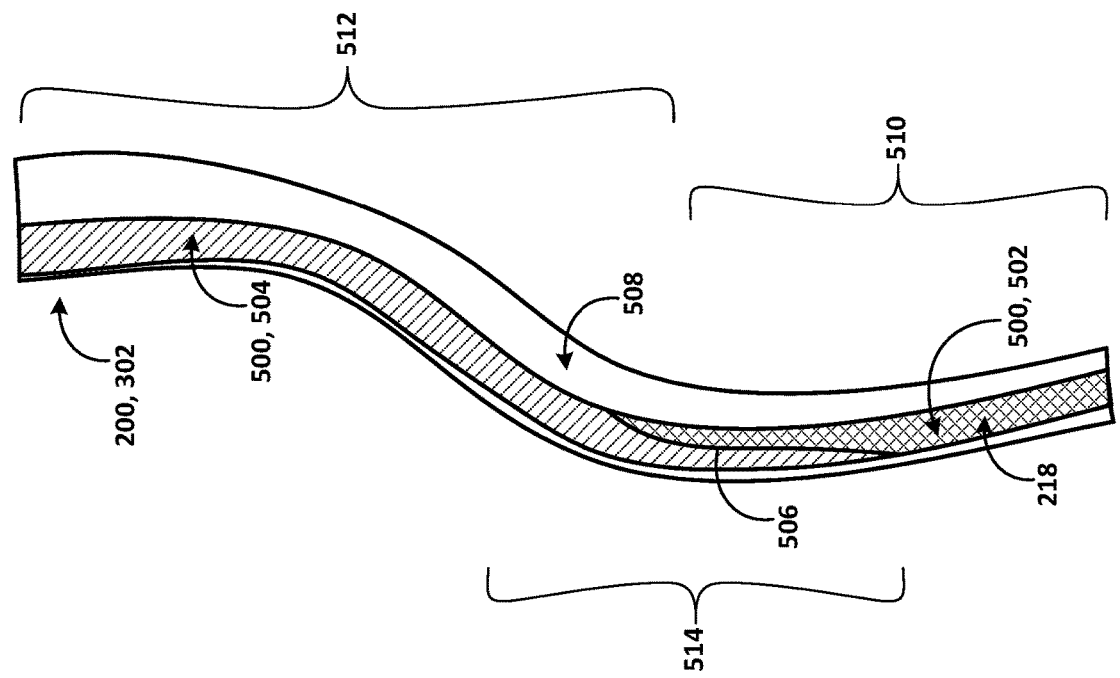

As shown, an edge guard 200, such as a forward-edge guard 302, may include one or more heating conduits 218. The airfoil body 304 may include one or more heating fluid inlets 256 that fluidly communicate with the one or more heating conduits 218. As shown, for example, in FIGS. 3A and 3B, an airfoil body 304 may include a heating fluid inlet 256 disposed about a root region 204 of the airfoil body 304 and/or a heating fluid inlet 256 disposed about a dovetail region 206 of the airfoil body 304. It will be appreciated that it is not necessary for an airfoil body 304 to include both a heating fluid inlet 256 located at the root region 204 and at the dovetail region 206, yet such embodiments are contemplated. For example, as shown in FIGS. 3C and 3D, in some embodiments, an airfoil body 304 may include one or more heating fluid inlets 256 located at the root region 204, or one or more heating fluid inlets 256 at the dovetail region 206. The airfoil body 304 may include one or more fluid supply conduits 312 disposed within at least a portion of the airfoil body 304, such as a dovetail region 206, a root region 204, and/or a working region 202, of the airfoil body 304. The one or more fluid supply conduits 312 may be defined at least in part by a structure of the airfoil body 304, such as a monolithic structure of the airfoil body 304. The one or more heating fluid inlets 256 may fluidly communicate with the one or more heating conduits 218 by way of one or more fluid supply conduits 312 disposed within the airfoil body 304. The airfoil body 304 may include one or more supply apertures 314 providing fluid communication between the one or more fluid supply conduits 312 and a corresponding one or more heating conduits 218, thereby allowing heating fluid to flow from the one or more fluid supply conduits 312 into the one or more heating conduits 218 within the edge guard 200. The edge guard 200 may include one or more heating conduit inlet-apertures 316 that interface with a corresponding one or more supply apertures 314 of the airfoil body 304.

Heating fluid that flows into the one or more heating conduits 218 may exit the heating conduits 218 through one or more heating fluid outlets 262 disposed in the edge guard 200 and/or in the airfoil body 304. In some embodiments, as shown in FIGS. 3A and 3B, the edge guard 200 may include one or more heating fluid outlets 262, such as a plurality of heating fluid outlets 262, that discharge heating fluid to a surface of the airfoil body 304, such as to a surface of the working region 202. Additionally, or in the alternative, as shown in FIGS. 3C and 3D, the airfoil body 304 may include one or more heating fluid outlets 262, such as a plurality of heating fluid outlets 262, that discharge heating fluid through the airfoil body 304, such as through the dovetail region 206 of the airfoil body 304. Additionally, or in the alternative, the one or more heating fluid outlets 262 may discharge heating fluid through the root region 204 and/or the working region 202 of the airfoil body 304.

In some embodiments, as shown in FIGS. 3C and 3D, the airfoil body 304 may include one or more fluid discharge conduits 318 disposed within at least a portion of the airfoil body 304, such as a dovetail region 206, a root region 204, and/or a working region 202, of the airfoil body 304. The one or more fluid discharge conduits 318 may be defined at least in part by a structure of the airfoil body 304, such as a monolithic structure of the airfoil body 304. The one or more heating fluid outlets 262 may fluidly communicate with the one or more heating conduits 218 by way of one or more fluid discharge conduits 318 disposed within the airfoil body 304.

The edge guard 200 may include one or more heating conduit outlet-apertures 320 providing fluid communication between one or more heating conduits 218 within the edge guard 200 and a corresponding one or more fluid discharge conduits 318, thereby allowing heating fluid that has circulated through one or more heating conduits 218 within the edge guard 200 to flow out of the one or more heating conduits 218 and into a corresponding one or more fluid discharge conduits 318 within the airfoil body 304. The one or more fluid discharge conduits 318 within the airfoil body 304 may include a corresponding one or more discharge apertures 322 that interface with a corresponding one or more heating conduit outlet-apertures 320 of the edge guard 200. Heating fluid that flows through the one or more fluid discharge conduits 318 may exit the airfoil body 304 through one or more heating fluid outlets 262. For example, as shown in FIGS. 3C and 3D, an airfoil body 304 may include a heating fluid outlet 262 disposed about a dovetail region 206 of the airfoil body 304.

The edge guards 200 may include a lattice structure that defines a matrix or network of pores, voids, channels, or the like. At least some of the pores, voids, channels, or the like, that are defined by the lattice structure may be interconnected with one another. Additionally, or in the alternative, at least a portion of the lattice structure may include discrete pores, voids, channels, or the like, that are separated from one another by respective elements of the lattice structure. The lattice structure of an edge guard 200 may be defined at least in part by one or more materials used to form the edge guard 200. For example, the edge guard 200 may be formed from one or more materials that have a lattice structure. Additionally, or in the alternative, the lattice structure may be defined at least in part by the manufacturing technology used to form the edge guard 200. For example, the edge guard 200 may be formed using a suitable additive manufacturing technology.

The heating conduits 218 within the edge guard 200 may be defined at least in part by the lattice structure. For example, the lattice structure may define a fluid domain through which the heating fluid may flow, such as a fluid domain that includes a plurality of tortuous pathways. The plurality of tortuous pathways may include a matrix or network of interconnected pores, voids, channels, or the like. A lattice structure that defines at least a portion of the heating conduits 218 may include a random or semi-random configuration of interconnected structural elements, such as cellular structures, branched structures, reticulated structures, mesh structures, and/or agglomerate structures. Additionally, or in the alternative, a lattice structure within an edge guard may include an array of agglomerate structures, such as sintered and/or unsintered powder material, and/or partially melted powder material, from the additive manufacturing process used to form the edge guard 200. While the heating conduits 218 within the edge guard 200 may be defined at least in part by a lattice structure, in some embodiments, an edge guard 200 may additionally or alternatively include a lattice structure that is separated from the one or more heating conduits 218. Additionally, or in the alternative, an edge guard 200 may include a lattice structure adjacent to at least a portion of the one or more heating conduits 218. For example, an edge guard 200 may include a lattice structure that is adjacent to a heating conduit 218 and the pores, voids, channels, or the like defined by the lattice structure may be separated from the heating conduit 218 by an internal wall of the edge guard 200 and/or by respective structural elements of the lattice structure.

In some embodiments, the one or more heating conduits 218 within an edge guard 200 may include a defined pathway determined at least in part by walls of the respective heating conduit 218 and/or by a lattice structure defining a respective portion of the heating conduit 218. Additionally, or in the alternative, a lattice structure that defines at least a portion of a heating conduit 218 may cause the heating fluid to flow along a tortuous pathway, such as through the pores, voids, channels, or the like, defined by the lattice structure. Such pores, voids, channels, or the like may themselves make up at least a portion of a heating conduit 218 within an edge guard 200. In some embodiments, the heating conduit 218 may include one or more baffles that define a pathway of the heating conduit 218 through the edge guard 200, such as a pathway through a lattice structure defining the heating conduit 218. Additionally, or in the alternative, a lattice boundary within the edge guard 200 may define a pathway of the heating conduit 218 through the edge guard 200.

FIGS. 4A-4D show exemplary pathways 400 of a heating conduit 218 through an edge guard 200, such as a forward-edge guard 302. The edge guards 200 shown in FIGS. 4A-4D may be attached to a fan blade 108 or to an outlet guide vane 148, such as to an airfoil body 304 thereof. The pathways 400 shown in FIGS. 4A-4D are provided by way of example and are not to be limiting. Any suitable pathway may be provided without departing from the scope of the present disclosure. It will be appreciated that the pathways 400 shown in FIGS. 4A-4D may represent a general direction of a bulk flow of the heating fluid that flows through a tortuous flowpath defined by a lattice structure, such as through a matrix or network of interconnected pores, voids, channels, or the like. Additionally, or in the alternative, the pathways 400 shown in FIG. 4A-4D may represent a general direction of a discrete flow of the heating fluid, such as may be defined by a boundary of a lattice structure and/or walls of the heating conduit 218. As shown in FIGS. 4A-4D, a heating conduit 218 may include a pathway 400 that traverses from a proximal region of the edge guard 200 toward a medial region of the edge guard and/or towards a distal region of the edge guard 200. As used herein, the term "proximal" or "proximal region," when used with reference to an edge guard 200, refers to a radially inward region of the edge guard 200, such as a region of the edge guard 200 oriented relatively closer to a longitudinal axis of the turbine engine 100. As used herein, the term "distal" or "distal region," when used with reference to an edge guard 200, refers to a radially outward region of the edge guard 200, such as a region of the edge guard 200 oriented relatively further from the longitudinal axis of the turbine engine 100. As used herein, the term "medial" or "medial region," when used with reference to an edge guard 200, refers to a radially Midgard region of the edge guard 200, such as a region of the edge guard 200 located between a proximal region and a distal region of the edge guard 200.

By way of example, as shown in FIG. 4A, a heating conduit 218 may include a pathway 400 from a proximal region of the edge guard 200, such as from a heating conduit inlet-aperture 316 located at a proximal region of the edge guard 200, towards a distal region of the edge guard 200. The heating conduit 218 may include a pathway 400 that leads to a heating fluid outlet 262 located at a distal region of the edge guard 200. Additionally, or in the alternative, as shown, for example, in FIG. 4B a heating conduit 218 may include a pathway 400 from a distal region of the edge guard 200 towards a proximal region of the edge guard 200. For example, a heating conduit 218 may include a pathway 400 from a heating conduit inlet-aperture 316 located at a proximal region of the edge guard 200 towards a medial region and/or towards a distal region of the edge guard 200, and then from the distal region and/or from the medial region of the edge guard 200 towards the proximal region of the edge guard 200. The heating conduit 218 may include a pathway 400 that exits the edge guard 200 through a heating conduit-outlet aperture 320 located at a proximal region of the edge guard 200. As shown in FIGS. 4C and 4D, a heating conduit 218 may include a pathway 400 that leads to a plurality of heating fluid outlets 262 located about one or more regions of the edge guard 200. For example, the plurality of heating fluid outlets 262 may be distributed about a radial axis of the edge guard 200. In some embodiments, at least some of the plurality of heating fluid outlets 262 may be distributed about a forward region 402 of the edge guard 200, as shown, for example in FIG. 4C. Additionally, or in the alternative, at least some of the plurality of heating fluid outlets 262 may be distributed about a lateral region 404 of the edge guard 200. A heating conduit 218 may include a pathway 400 through any one or more cross-sectional regions of the edge guard 200, such as a forward region 402 and/or a lateral region 404. Additionally, or in the alternative, a heating conduit 218 may include a pathway 400 through an outward region 406 of the edge guard 200 and/or an inward region 408 of the edge guard 200.

Figure 6A:
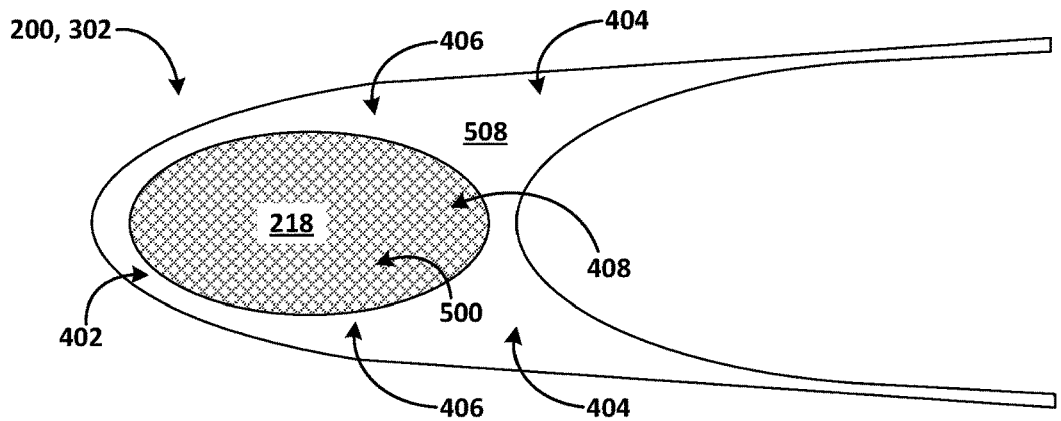
FIGS. 6A-6C schematically depict cross-sectional views of exemplary edge guards that may be attached to an airfoil, such as a fan blade or an outlet guide vane.
Figure 6B:
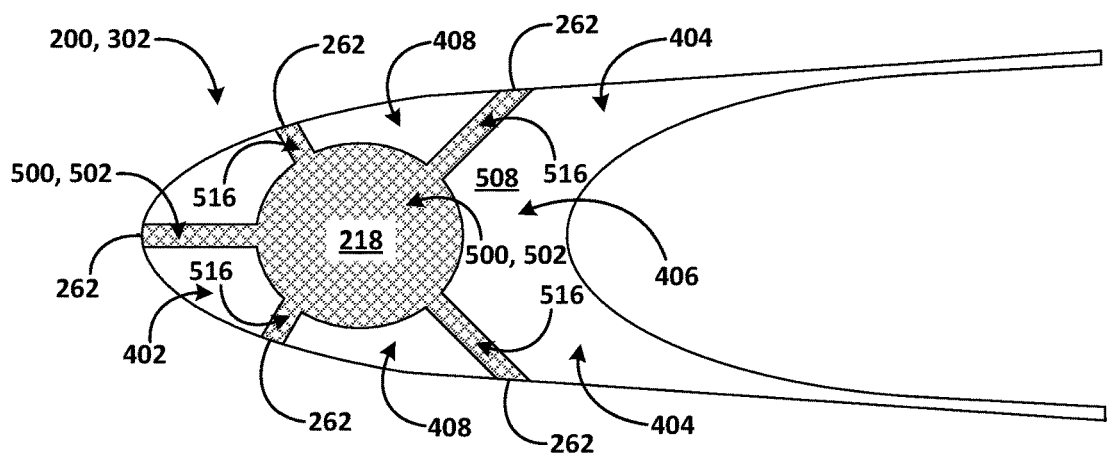
Figure 6C:
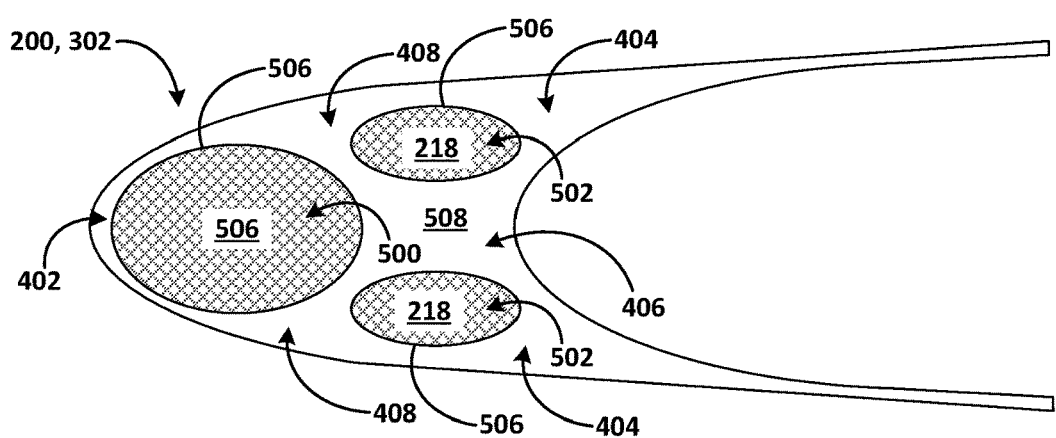

Referring now to FIGS. 5A-5D, and FIGS. 6A-6C, exemplary edge guards 200, such as exemplary forward-edge guards 302, are further described. FIGS. 5A-5D schematically depict a respective side perspective view of an exemplary edge guard 200. FIGS. 6A-6C schematically depict a respective cross-sectional view of an exemplary edge guard 200. The cross-sectional views shown in FIGS. 6A-6C may represent separate exemplary edge guards 200. Additionally, or in the alternative, any two or more of the cross-sectional views shown in FIGS. 6A-6C may represent respectively different locations of the same edge guard 200. Additionally, or in the alternative, any one or more of the cross-sectional views shown in FIGS. 6A-6C may represent a cross-section of any one of the edge guards 200 in FIGS. 5A-5D depicted in side-perspective view.

As shown in FIGS. 5A-5D, and FIGS. 6A-6D, an edge guard 200 may include one or more lattice structures 500 disposed within the edge guard 200. In some embodiments, a lattice structure 500, and/or at least a portion of a lattice structure 500, may define a fluid domain 502. Additionally, or in the alternative, a lattice structure 500, and/or at least a portion of a lattice structure 500, may define a toughened domain 504. As used herein, the term "fluid domain," when used in reference to a lattice structure 500, refers to a lattice structure 500 and/or a portion of a lattice structure 500 that defines at least a portion of a heating conduit 218 such that heating fluid may flow therethrough. As used herein, the term "toughened domain" refers to a lattice structure 500 and/or a portion of a lattice structure 500 that lacks fluid communication with a fluid domain 502. For example, a toughened domain 504 may be separated from a fluid domain 502 by boundary walls 506 of the respective lattice structures 500 and/or by body region 508 of the edge guard 200. A lattice structure 500, including a toughened domain 504 and/or a fluid domain 502 may provide enhanced impact resistance properties to the edge guard 200.

In some embodiments, an edge guard 200, and/or a lattice structure 500 of an edge guard 200, that has enhanced impact resistance may exhibit one or more enhanced physical properties relative to a reference material. Such enhanced physical properties may include enhanced toughness, enhanced flexural modulus, enhanced bulk modulus, enhanced hardness, enhanced elasticity, or enhanced ductility, as well as combinations of these. For an edge guard 200, such as a body region 508 of an edge guard 200 and/or an edge guard 200 that does not include a lattice structure 500, a reference material for determining an enhanced physical property of the edge guard 200 may be a material used to form the airfoil body 304 of the airfoil 300 (e.g., fan blade 108 or outlet guide vane 148) corresponding to the edge guard 200. For a lattice structure 500 of an edge guard 200, such as a toughened domain 504 and/or a fluid domain 502, a reference material for determining an enhanced physical property may be material used to form a body region 508 of the edge guard 200.

In some embodiments, an edge guard 200 and/or a lattice structure 500 of an edge guard 200 may exhibit an enhanced toughness relative to a reference material. By way of example, a reference material used to form an airfoil body 304 may exhibit a toughness that is at least about 10% less than a toughness of an edge guard 200 (e.g., a body region 508 of an edge guard 200 and/or an edge guard 200 that does not include a lattice structure 500), such as at least about 25% less, such as at least about 75% less, or such as at least about 90% less than the toughness of the edge guard 200. Additionally, or in the alternative, a reference material used to form a body region 508 of an edge guard 200 may exhibit a toughness that is at least about 10% less than a toughness of a lattice structure 500 of the edge guard 200, such as at least about 25% less, such as at least about 75% less, or such as at least about 90% less than the toughness of the lattice structure 500 of the edge guard 200. By way of example, toughness may be determined according to ASTM E8 or ASTM E21.

In some embodiments, an edge guard 200 and/or a lattice structure 500 of an edge guard 200 may exhibit an enhanced flexural modulus relative to a reference material. By way of example, a reference material used to form an airfoil body 304 may exhibit a flexural modulus that is at least about 10% less than a flexural modulus of an edge guard 200 (e.g., a body region 508 of an edge guard 200 and/or an edge guard 200 that does not include a lattice structure 500), such as at least about 25% less, such as at least about 75% less, or such as at least about 90% less than the flexural modulus of the edge guard 200. Additionally, or in the alternative, a reference material used to form a body region 508 of an edge guard 200 may exhibit a flexural modulus that is at least about 10% less than a flexural modulus of a lattice structure 500 of the edge guard 200, such as at least about 25% less, such as at least about 75% less, or such as at least about 90% less than the flexural modulus of the lattice structure 500 of the edge guard 200. By way of example, flexural modulus may be determined according to ASTM E855 or ASTM E1876.

In some embodiments, an edge guard 200 and/or a lattice structure 500 of an edge guard 200 may exhibit an enhanced elastic modulus relative to a reference material. By way of example, an edge guard 200 may exhibit an elastic modulus that is at least about 10% less than an elastic of a reference material used to form an airfoil body 304, such as at least about 25% less, such as at least about 75% less, or such as at least about 90% less than the elastic modulus of the reference material. Additionally, or in the alternative, a reference material used to form a body region 508 of an edge guard 200 may exhibit an elastic modulus that is at least about 10% less than an elastic modulus of a lattice structure 500 of the edge guard 200, such as at least about 25% less, such as at least about 75% less, or such as at least about 90% less than the elastic modulus of the lattice structure 500 of the edge guard 200. By way of example, elastic modulus may be determined according to ASTM E8 or ASTM E21.

In some embodiments, an edge guard 200 and/or a lattice structure 500 of an edge guard 200 may exhibit an enhanced ductility relative to a reference material. By way of example, an edge guard 200 may exhibit a ductility that is at least about 10% less than an elastic of a reference material used to form an airfoil body 304, such as at least about 25% less, such as at least about 75% less, or such as at least about 90% less than the ductility of the reference material. Additionally, or in the alternative, a reference material used to form a body region 508 of an edge guard 200 may exhibit a ductility that is at least about 10% less than a ductility of a lattice structure 500 of the edge guard 200, such as at least about 25% less, such as at least about 75% less, or such as at least about 90% less than the ductility of the lattice structure 500 of the edge guard 200. By way of example, ductility may be determined according to ASTM E8 or ASTM E21.

In some embodiments, an edge guard 200 may include a lattice structure 500 that has a density that is at least about 10% less than a density of a body region 508 of the edge guard 200, such as at least about 25% less, such as at least about 75% less, or such as at least about 90% less than the density of the body region 508 of the edge guard 200. In some embodiments, a lattice structure 500 of an edge guard 200 may exhibit an enhanced toughness, flexural modulus, elastic modulus, and/or ductility relative to a body region 508 of the edge guard 200, combined with low density.

A lattice structure 500 may span all or a portion of a longitudinal length of an edge guard 200. As shown, for example, in FIG. 5A, a lattice structure 500 may include a fluid domain 502 disposed about a proximal region 510 of the edge guard 200. Additionally, or in the alternative, a lattice structure 500 may include a toughened domain 504 disposed about a distal region 512 of the edge guard 200. The fluid domain 502 and/or the toughened domain 504 may additionally or alternatively be disposed about a medial region 514 of the edge guard 200. As shown, for example, in FIG. 5B, an edge guard 200 may include a fluid domain 502 and a toughened domain 504 that respectively span from a proximal region 510 to a distal region 512. As shown, for example, in FIG. 5C, an edge guard 200 may include a fluid domain 502 that spans from a proximal region 510 to a medial region 514, and/or a toughened domain 504 that spans from a medial region 514 to a distal region 512. In some embodiments, as shown, for example, in FIG. 5D, an edge guard 200 may include a fluid domain 502 that is limited to a proximal region 510. In some embodiments, as shown, for example, in FIGS. 5A and 5C, an edge guard 200 may include a lattice structure 500 that transitions from a fluid domain 502 to a toughened domain 504. The transition from a fluid domain 502 to a toughened domain 504 may be located at least in part at a medial region 514 of the edge guard 200. The transition from the fluid domain 502 to the toughened domain 504 may be abrupt, as shown, for example in FIG. 5A, or gradual, as shown, for example, in FIG. 5C.

As shown in FIG. 6A, an edge guard 200 may include one or more heating conduits 218 that may occupy any desired cross-sectional region of the edge guard 200, such as a forward region 402, a lateral region 404, an inward region 408, and/or an outward region 406. As shown, for example, in FIG. 6B, the one or more heating conduits 218 may include one or more heating fluid outlets 262. An edge guard 200 may include one or more outlet channels 516 that provide fluid communication between a heating conduit 218 and a heating fluid outlet 262. In some embodiments, the outlet channels 516 may be defined at least in part by a lattice structure 500. In some embodiments, an edge guard 200 may include a plurality of heating fluid outlets 262 distributed about a cross-sectional perimeter of the edge guard 200. As shown, for example, in FIG. 6C, an edge guard 200 may include a plurality of lattice structures 500 that are separated from one another, for example, by boundary walls 506 of the respective lattice structures 500 and/or by body region 508 of the edge guard 200. In some embodiments, a lattice structure 500 may define a toughened domain 504 that provides enhanced impact resistance properties to the edge guard 200. The toughened domain 504 may be separate from one or more fluid domains 502. In some embodiments, at least a portion of a toughened domain 504 may be located about a forward region 402 of an edge guard 200. Additionally, or in the alternative, one or more fluid domains may be located about a lateral region 404 and/or an inward region 408 of the edge guard 200.

The configuration of a lattice structure 500 may be selected at least in part to provide one or more fluid domains 502 that respectively define at least a portion of a heating conduits 218 with desired flow properties of heating fluid therethrough, such as a desired flow rate or pressure. Additionally, or in the alternative, the configuration of the lattice structure 500 may be selected at least in part to provide desired heat transfer properties between an inlet airflow 154 (FIG. 2) and the edge guard 200, such as a desired rate of heat transfer from the heating fluid to the edge guard 200, or one or more regions thereof, to provide suitable de-icing or anti-icing properties. In addition, or in the alternative to providing desired flow properties and/or heat transfer properties, the lattice structure 500 may be configured to provide desired structural properties, including enhanced toughness, flexural modulus, bulk modulus, hardness, elasticity, or ductility, as well as combinations of these, resulting in correspondingly good energy absorption and/or impact resistance. By way of example, in some embodiments, a distal region and/or a medial region of an edge guard 200 may include a lattice structure 500 that defines a toughened domain 504 that has good impact resistance properties. Additionally, or in the alternative, a proximal region of the edge guard 200 may include a lattice structure 500 that defines a fluid domain 502 and that has good heat transfer properties and/or good fluid flow properties. In some embodiments, a toughened domain 504 may be located about a distal region and/or a proximal region of the edge guard 200 and a heating conduit 218 may be located about a proximal region of the edge guard 200. The toughened domain 504 may be separate from the heating conduit 218. Additionally, or in the alternative, a lattice structure 500 may extend from a proximal region to a medial region and/or to a distal region of the edge guard 200, and the configuration of the lattice structure 500 may differ as between the proximal region and the medial region and/or the distal region. For example, at the proximal region, one or more properties of the lattice structure 500 may be configured for enhanced flow properties and/or heat transfer properties about a proximal region. Additionally, or in the alternative, at the medial region and/or the distal region, one or more properties of the lattice structure 500 may be configured for enhanced impact resistance. The lattice structure 500 may include one or more properties that transition gradually or abruptly along a radial axis of the edge guard 200. Exemplary properties that may be modified to realize desired fluid flow, heat transfer, and/or impact resistance include a geometric shape of the lattice structure 500, a void volume percentage of the lattice structure 500, a density of the lattice structure 500, and/or a material composition of the lattice structure 500.

In some embodiments, an edge guard 200 may include lattice structure 500 that defines a toughened domain 504 that contains a dilatant material. As used herein, the term "dilatant" refers to a material that exhibits shear thickening, meaning that a viscosity of the material increases with increasing shear strain. A dilatant material may sometimes be referred to as a non-Newtonian material. A dilatant material may include a fluid and/or a fluid that contains suspended solids, such as particles. The shear thickening behavior of a dilatant fluid that contains suspended solids may depend at least in part on the size, shape, distribution, and volume fraction of particles in suspension, particle-particle interactions, and continuous phase viscosity. The particles may be stabilized in suspension, such as by way of electrostatic forces and/or steric forces. The suspended solids may include nanoparticles, capable of forming a colloidal suspension in fluid. Exemplary nanoparticles that may be included in a dilatant material include silica nanoparticles, calcium carbonate nanoparticles, polyethylene nanoparticles, polymethylmethacrylate particles, as well as combinations of these. Exemplary fluids within which nanoparticles may be suspended to form a dilatant material include silicone-based oils, ethylene glycol, polyethylene glycol, or ethanol, as well as combinations of these. Any one or more suitable kinds of nanoparticles may be suspended in any one or more suitable fluids to form a dilatant material. By way of example, an exemplary dilatant material may include silica nanoparticles suspended in polyethylene glycol. The dilatant material may be contained within a matrix or network of pores, voids, channels, or the like, defined by the lattice structure 500.

With reference to FIGS. 2-6D, the presently disclosed edge guards 200 and airfoil bodies 304 (e.g., fan blades 108, and outlet guide vanes 148) may include any desired material or combination of materials. In some embodiments, an edge guard 200 or an airfoil body 304 (e.g., a fan blade 108 and/or an outlet guide vane 148) may be formed at least in part from a metal alloy. Exemplary metal alloys that may be utilized to form at least a portion of an edge guard 200 or an airfoil body 304 (e.g., a fan blade 108 and/or an outlet guide vane 148) include stainless-steel alloys, cobalt-chrome alloys, aluminum alloys, titanium alloys, nickel-based superalloys, and cobalt-based superalloys. In some embodiments, an edge guard 200 may be formed at least in part from at least one of: an aluminum-lithium alloy, a titanium-aluminum alloy, and a titanium alloy.

Additionally, or in the alternative, an edge guard 200 or an airfoil body 304 (e.g., a fan blade 108 and/or an outlet guide vane 148) may be formed at least in part from a matrix composite, such as a metal matrix composite, a ceramic matrix composite, or a polymer matrix composite. A matrix composite may include a matrix material and a reinforcing material. Exemplary reinforcing materials that may be included in a matrix composite, such as a metal matrix composite, a ceramic matrix composite, or a polymer matrix composite, may include fibers, nanotubes, whiskers, platelets, or particles, as well as combinations of these. An exemplary reinforcing material, such as fibers, nanotubes, whiskers, platelets, or particles, may be formed at least in part of a material that includes carbon, graphite, graphene, alumina, mullite, iron, silicon carbide, aluminum nitride, silicon nitride, zirconia, or silica. Additionally, or in the alternative, an exemplary reinforcing material, such as fibers, nanotubes, whiskers, platelets, or particles may be formed at least in part of a material that includes a metal alloy, such as a stainless-steel alloy, a cobalt-chrome alloy, an aluminum alloy, a titanium alloy, an aluminum-lithium alloy, a titanium-aluminum alloy, a nickel-based superalloy, or a cobalt-based superalloy, as well as combinations of these. Additionally, or in the alternative, an exemplary reinforcing material, such as fibers, nanotubes, whiskers, platelets, or particles may be formed at least in part of a material that includes a ceramic, such as alumina, beryllia, ceria, zirconia, carbide, boride, nitride, or silicide, as well as combinations of these. For example, a ceramic reinforcing material may include silicon carbide, aluminum silicate, aluminum nitride, silicon nitride, or titanium carbide, as well as combinations of these. In some embodiments, the reinforcing material, such as the fibers, nanotubes, whiskers, platelets, or particles, may have a monocrystalline structure.

In some embodiments, the reinforcing material may include carbon fibers (woven and/or laminate), carbon nanotubes, carbon whiskers, carbon platelets, or carbon particles, as well as combinations of these. Additionally, or in the alternative, the reinforcing material may include graphite fibers (woven and/or laminate), graphite nanotubes, graphite whiskers, graphite platelets, or graphite particles, as well as combinations of these. Additionally, or in the alternative, the reinforcing material may include graphene fibers (woven and/or laminate), graphene nanotubes, graphene whiskers, graphene platelets, or graphene particles, as well as combinations of these. Additionally, or in the alternative, the reinforcing material may include alumina fibers, alumina nanotubes, alumina whiskers, alumina platelets, or alumina particles, as well as combinations of these. Additionally, or in the alternative, the reinforcing material may include mullite fibers, mullite nanotubes, mullite whiskers, mullite platelets, or mullite particles, as well as combinations of these. Additionally, or in the alternative, the reinforcing material may include iron fibers, iron nanotubes, iron whiskers, iron platelets, or iron particles, as well as combinations of these. Additionally, or in the alternative, the reinforcing material may include silicon carbide fibers, silicon carbide nanotubes, silicon carbide whiskers, silicon carbide platelets, or silicon carbide particles, as well as combinations of these. Additionally, or in the alternative, the reinforcing material may include aluminum nitride fibers, aluminum nitride nanotubes, aluminum nitride whiskers, aluminum nitride platelets, or aluminum nitride particles, as well as combinations of these. Additionally, or in the alternative, the reinforcing material may include silicon nitride fibers, silicon nitride nanotubes, silicon nitride whiskers, silicon nitride platelets, or silicon nitride particles, as well as combinations of these. Additionally, or in the alternative, the reinforcing material may include zirconia fibers, zirconia nanotubes, zirconia whiskers, zirconia platelets, or zirconia particles, as well as combinations of these. Additionally, or in the alternative, the reinforcing material may include silica fibers, silica nanotubes, silica whiskers, silica platelets, or silica particles, as well as combinations of these.

In some embodiments, the reinforcing material may include metal alloy fibers, metal alloy nanotubes, metal alloy whiskers, metal alloy platelets, or metal alloy particles, as well as combinations of these. For example, the reinforcing material may include stainless-steel alloy fibers, stainless-steel alloy nanotubes, stainless-steel alloy whiskers, stainless-steel alloy platelets, or stainless-steel alloy particles, as well as combinations of these. Additionally, or in the alternative, the reinforcing material may include cobalt-chrome alloy fibers, cobalt-chrome alloy nanotubes, cobalt-chrome alloy whiskers, cobalt-chrome alloy platelets, or cobalt-chrome alloy particles, as well as combinations of these. Additionally, or in the alternative, the reinforcing material may include aluminum alloy fibers, aluminum alloy nanotubes, aluminum alloy whiskers, aluminum alloy platelets, or aluminum alloy particles, as well as combinations of these. Additionally, or in the alternative, the reinforcing material may include titanium alloy fibers, titanium alloy nanotubes, titanium alloy whiskers, titanium alloy platelets, or titanium alloy particles, as well as combinations of these. Additionally, or in the alternative, the reinforcing material may include nickel-based superalloy fibers, nickel-based superalloy nanotubes, nickel-based superalloy whiskers, nickel-based superalloy platelets, or nickel-based superalloy particles, as well as combinations of these. Additionally, or in the alternative, the reinforcing material may include cobalt-based superalloy fibers, cobalt-based superalloy alloy nanotubes, cobalt-based superalloy whiskers, cobalt-based superalloy platelets, or cobalt-based superalloy particles, as well as combinations of these.

In some embodiments, the reinforcing material may include ceramic fibers, ceramic nanotubes, ceramic whiskers, ceramic platelets, or ceramic particles, as well as combinations of these. For example, the reinforcing material may include silicon carbide fibers, silicon carbide nanotubes, silicon carbide whiskers, silicon carbide platelets, or silicon carbide particles, as well as combinations of these. Additionally, or in the alternative, the reinforcing material may include aluminum silicate fibers, aluminum silicate nanotubes, aluminum silicate whiskers, aluminum silicate platelets, or aluminum silicate particles, as well as combinations of these. Additionally, or in the alternative, the reinforcing material may include aluminum nitride fibers, aluminum nitride nanotubes, aluminum nitride whiskers, aluminum nitride platelets, or aluminum nitride particles, as well as combinations of these. Additionally, or in the alternative, the reinforcing material may include silicon nitride fibers, silicon nitride nanotubes, silicon nitride e whiskers, silicon nitride platelets, or silicon nitride particles, as well as combinations of these. Additionally, or in the alternative, the reinforcing material may include titanium carbide fibers, titanium carbide nanotubes, titanium carbide whiskers, titanium carbide platelets, or titanium carbide particles, as well as combinations of these. In some embodiments, the reinforcing material may be coated with nickel or titanium boride, for example, to prevent chemical reactions between the reinforcing material and the matrix material.

Additionally, or in the alternative, a reinforcing material may include one or more materials that have pseudoelastic, pseudoplastic, superelastic, and/or superplastic properties, such as one or more shape-memory alloys. Exemplary shape-memory alloys that may be included as a reinforcing material include copper-aluminum-nickel alloys, nickel-titanium alloys, iron-manganese-silicon alloys, copper-zinc-aluminum alloys, and copper-aluminum-nickel alloys, or the like. A reinforcing material that includes a pseudoelastic material, a pseudoplastic material, a superelastic material, and/or a superplastic material, such as one or more shape-memory alloys, may be provided in the form of fibers, nanotubes, whiskers, platelets, or particles, as well as combinations of these.

In some embodiments, at least a portion of an edge guard 200 or an airfoil body 304 (e.g., a fan blade 108 and/or an outlet guide vane 148) may be formed at least in part of a material that includes a metal matrix composite. An exemplary metal matrix composite may include a metal-alloy matrix and a reinforcing material. Exemplary metal alloys that may be included in a metal-alloy matrix include stainless-steel alloys, cobalt-chrome alloys, aluminum alloys, titanium alloys, nickel-based superalloys, and cobalt-based superalloys. By way of example, a metal-alloy matrix may include an aluminum alloy, a titanium alloy, aluminum-lithium alloy, titanium-aluminum alloy, as well as combinations of these. As another example, an exemplary metal matrix composite may include an aluminum-graphene composite. An aluminum-graphene composite may include an aluminum-alloy matrix and a reinforcing material that includes graphene. In some embodiments, an aluminum-graphene composite may exhibit enhanced thermal conductivity, which may provide enhanced anti-icing properties.

Additionally, or in the alternative, a metal-alloy matrix may include one or more materials that have pseudoelastic, pseudoplastic, superelastic, and/or superplastic properties, such as one or more shape-memory alloys. Exemplary shape-memory alloys that may be included as a metal-alloy matrix include copper-aluminum-nickel alloys, nickel-titanium alloys, iron-manganese-silicon alloys, copper-zinc-aluminum alloys, and copper-aluminum-nickel alloys, or the like.

In some embodiments, at least a portion of an edge guard 200 or an airfoil body 304 (e.g., a fan blade 108 and/or an outlet guide vane 148) may be formed at least in part of a material that includes a ceramic matrix composite. An exemplary ceramic matrix composite may include a ceramic matrix and a reinforcing material. Exemplary ceramic materials that may be included in a ceramic matrix include alumina, beryllia, ceria, yttria, zirconia, carbide, boride, nitride, or silicide, as well as combinations of these. For example, a ceramic matrix may include silicon carbide, aluminum silicate, aluminum nitride, silicon nitride, or titanium carbide, as well as combinations of these.

In some embodiments, at least a portion of an edge guard 200 or an airfoil body 304 (e.g., a fan blade 108 and/or an outlet guide vane 148) may be formed at least in part of a material that includes a polymer matrix composite. An exemplary polymer matrix composite may include a polymer matrix and a reinforcing material. Exemplary polymer materials that may be included in a polymer matrix may include thermoplastic polymers and/or thermosetting polymers. For example, a polymer matrix may include one or more thermoplastic elastomer, such as thermoplastic polyurethanes, thermoplastic copolyester, thermoplastic polyamides, thermoplastic polyolefinelastomers, thermoplastic vulcanizates, styrenic block copolymers, other thermoplastic elastomers, as well as combinations of these. As another example, a polymer matrix may include one or more thermoset resins, such as epoxy resins, polyurethane resins, phenolic resins, and the like. A polymer matrix may include a curing agent, such as methylene-dianiline, sulfonyldianiline, aliphatic amines, polyaminoamides, and the like. In some embodiments, a polymer matrix composite may include a polymer matrix that includes thermoplastic polyurethane and a reinforcing material that includes carbon nanotubes.

In some embodiments, an edge guard 200 formed at least in part from a metal alloy may be attached to an airfoil body 304 (e.g., a fan blade 108 and/or an outlet guide vane 148) that is formed at least in part of a material that includes a metal alloy. The edge guard 200 may include one or more metal alloys that differ from one or more metal alloys included in the airfoil body 304 (e.g., the fan blade 108 or the outlet guide vane 148) to which the edge guard 200 is attached. For example, an edge guard 200 formed at least in part of a material that includes a first metal alloy, such as a titanium alloy, may be attached to an airfoil body 304 (e.g., a fan blade 108 or an outlet guide vane 148) formed at least in part of a material that includes a second metal alloy, such as an aluminum-lithium alloy, a titanium-aluminum alloy, as well as combinations of these. Additionally, or in the alternative, an edge guard 200 formed at least in part from a matrix composite may be attached to an airfoil body 304 (e.g., a fan blade 108 or an outlet guide vane 148) that is formed at least in part of a material that includes a matrix composite. The edge guard 200 may include one or more matrix composites that differ from one or more matrix composites included in the airfoil body 304 (e.g., the fan blade 108 and/or the outlet guide vane 148) to which the edge guard 200 is attached. For example, an edge guard 200 formed at least in part of a material that includes a first matrix composite, may be attached to an airfoil body 304

(e.g., a fan blade 108 or an outlet guide vane 148) formed at least in part of a material that includes a second matrix composite.

Additionally, or in the alternative, an edge guard 200 formed at least in part from a matrix composite may be attached to an airfoil body 304 (e.g., a fan blade 108 or an outlet guide vane 148) that is formed at least in part of a material that includes a metal alloy. For example, an edge guard 200 formed at least in part of a material that includes a matrix composite may be attached to an airfoil body 304 (e.g., a fan blade 108 or an outlet guide vane 148) that is formed at least in part of a material that includes an aluminum-lithium alloy, a titanium-aluminum alloy, as well as combinations of these. Such an airfoil body 304 may include an edge guard 200 formed at least in part of a material that includes any desired matrix composite, such as a metal matrix composite, a ceramic matrix composite, or a polymer matrix composite.

Additionally, or in the alternative, an edge guard 200 formed at least in part from a metal alloy may be attached to an airfoil body 304 (e.g., a fan blade 108 or an outlet guide vane 148) that is formed at least in part of a material that includes a matrix composite. For example, an edge guard 200 formed at least in part of a material that includes a titanium alloy may be attached to an airfoil body 304 (e.g., a fan blade 108 or an outlet guide vane 148) that is formed at least in part of a material that includes a matrix composite, such as a metal matrix composite, a ceramic matrix composite, or a polymer matrix composite.

Figure 7:
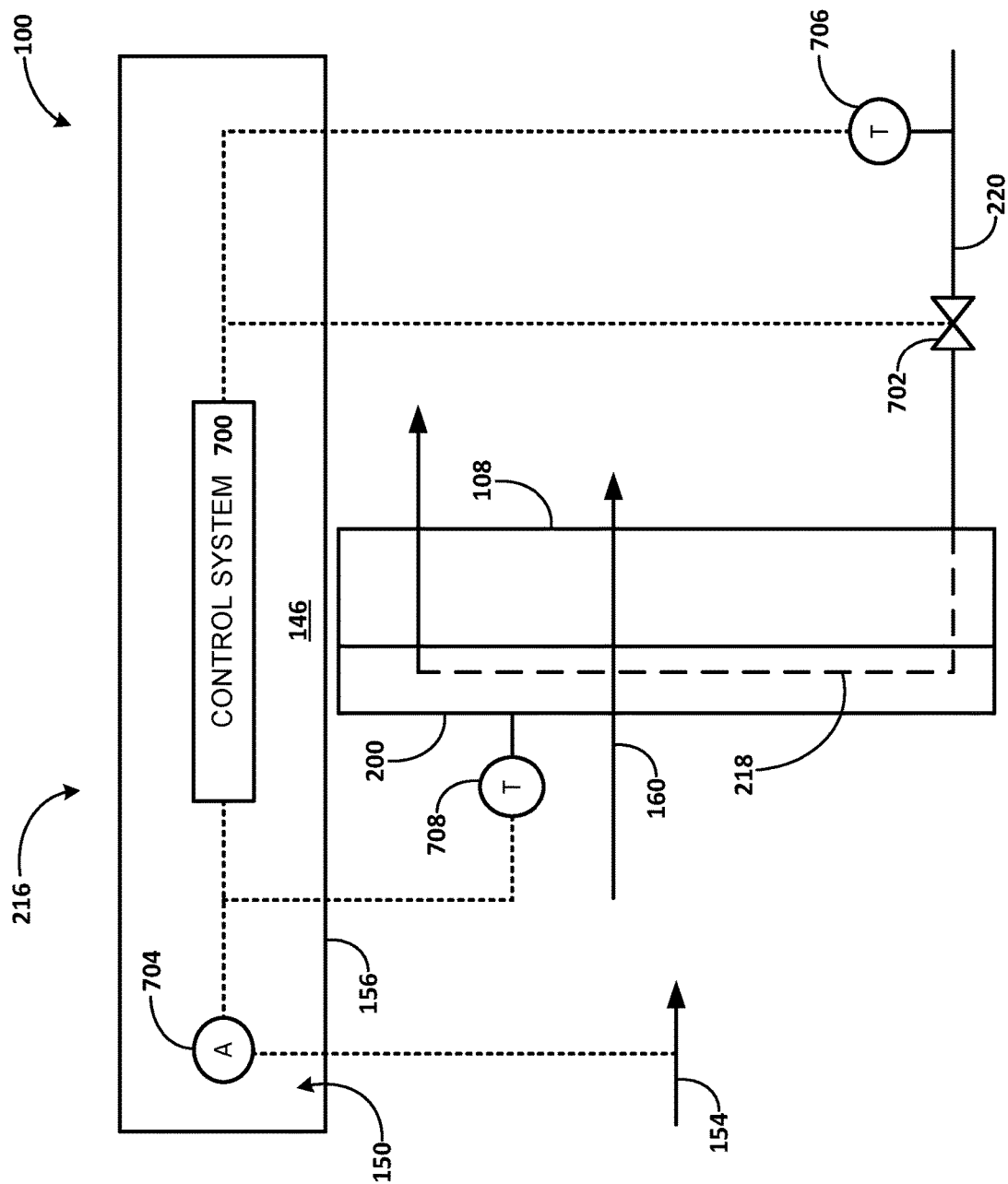
FIG. 7 schematically depicts an exemplary anti-icing system.

Now referring to FIG. 7, an exemplary anti-icing system 216 is further described. As shown in FIG. 7, an anti-icing system 216 may include one or more fluid supply pathways 220 configured to supply heating fluid to a heating conduit 218 disposed within an edge guard 200 attached to an airfoil body 304. The edge guard 200 may be attached to a fan blade 108, as shown in FIG. 7, or the edge guard 200 may be attached to an outlet guide vane 148, as shown in FIG. 2. The anti-icing system 216 may include a plurality of edge guards 200 respectively attached to a fan blade 108 or to an outlet guide vane 148. Respective ones of the plurality of edge guards 200 may include a heating conduit 218 disposed within the respective edge guard 200. One or more fluid supply pathways 220 may be configured to supply heating fluid to the heating conduit 218 disposed within the respective edge guard 200. The anti-icing system 216 may include a control system 700.

The control system 700 may be configured to control operations of the anti-icing system 216. The anti-icing system 216 may include one or more sensors and one or more controllable components. The control system 700 may be configured to receive electronic inputs from the one or more sensors, and to provide control commands to one or more controllable components based at least in part on an electronic input from the one or more sensors. In some embodiments, the anti-icing system 216 may include a fluid supply valve 702. The fluid supply valve 702 may be configured to start, stop, and/or modulate a flow of heating fluid through a fluid supply pathway 220. The control system 700 may be configured to actuate the fluid supply valve 702 to provide a flow of heating fluid to respective heating conduits 218 disposed within respective edge guards 200. In some embodiments, the control system 700 may actuate the fluid supply valve 702 (e.g., open, close, and/or modulate) based at least in part on an electronic input from a user. The control system 700 may actuate the fluid supply valve 702, for example, to start, stop, and/or modulate a flow of heating fluid to the respective heating conduits 218. Additionally, or in the alternative, the control system 700 may actuate the fluid supply valve 702 (e.g., open, close, and/or modulate) based at least in part on an electronic input from one or more sensors.

In some embodiments, the anti-icing system 216 may include an atmospheric sensor 704. The atmospheric sensor 704 may be configured to determine one or more atmospheric conditions associated with an inlet airflow 154 and/or a bypass airflow 160 that passes across the fan blades 108 and/or the outlet guide vanes 148. For example, the atmospheric sensor 704 may be configured to determine water vapor, temperature, pressure, humidity, air speed, altitude, and/or other atmospheric conditions. The control system 700 may be configured to actuate the fluid supply valve 702 based at least in part on an electronic input from one or more atmospheric sensors 704. For example, the control system 700 may be configured to start, stop, and/or modulate a flow of heating fluid to the respective heating conduits 218 based at least in part on an electronic input from one or more atmospheric sensors 704.

Additionally, or in the alternative, in some embodiments, the anti-icing system 216 may include one or more temperature sensors configured to determine a temperature of the heating fluid and/or a temperature of a one or more locations of the edge guards 200, fan blades 108, and/or outlet guide vanes 148. For example, the anti-icing system 216 may include a heating fluid-temperature sensor 706 configured to determine a temperature of the heating fluid. Additionally, or in the alternative, the anti-icing system 216 may include an airfoil-temperature sensor 708 configured to determine a temperature of one or more locations of the edge guards 200, fan blades 108, and/or outlet guide vanes 148. The airfoil-temperature sensor 708 may be configured with any suitable temperature-sensing modality. For example, the airfoil-temperature sensor 708 may be configured as an infrared temperature sensor, a thermocouple, a thermopile, an RTD (resistance temperature detector), a thermistor, or the like. The control system 700 may be configured to actuate the fluid supply valve 702 based at least in part on an electronic input from the heating fluid-temperature sensor 706 and/or based at least in part on an electronic input from an airfoil-temperature sensor 708. For example, the control system 700 may be configured to start, stop, and/or modulate a flow of heating fluid to the respective heating conduits 218 based at least in part on an electronic input from a heating fluid-temperature sensor 706 and/or an electronic input from an airfoil-temperature sensor 708.

Figure 8:
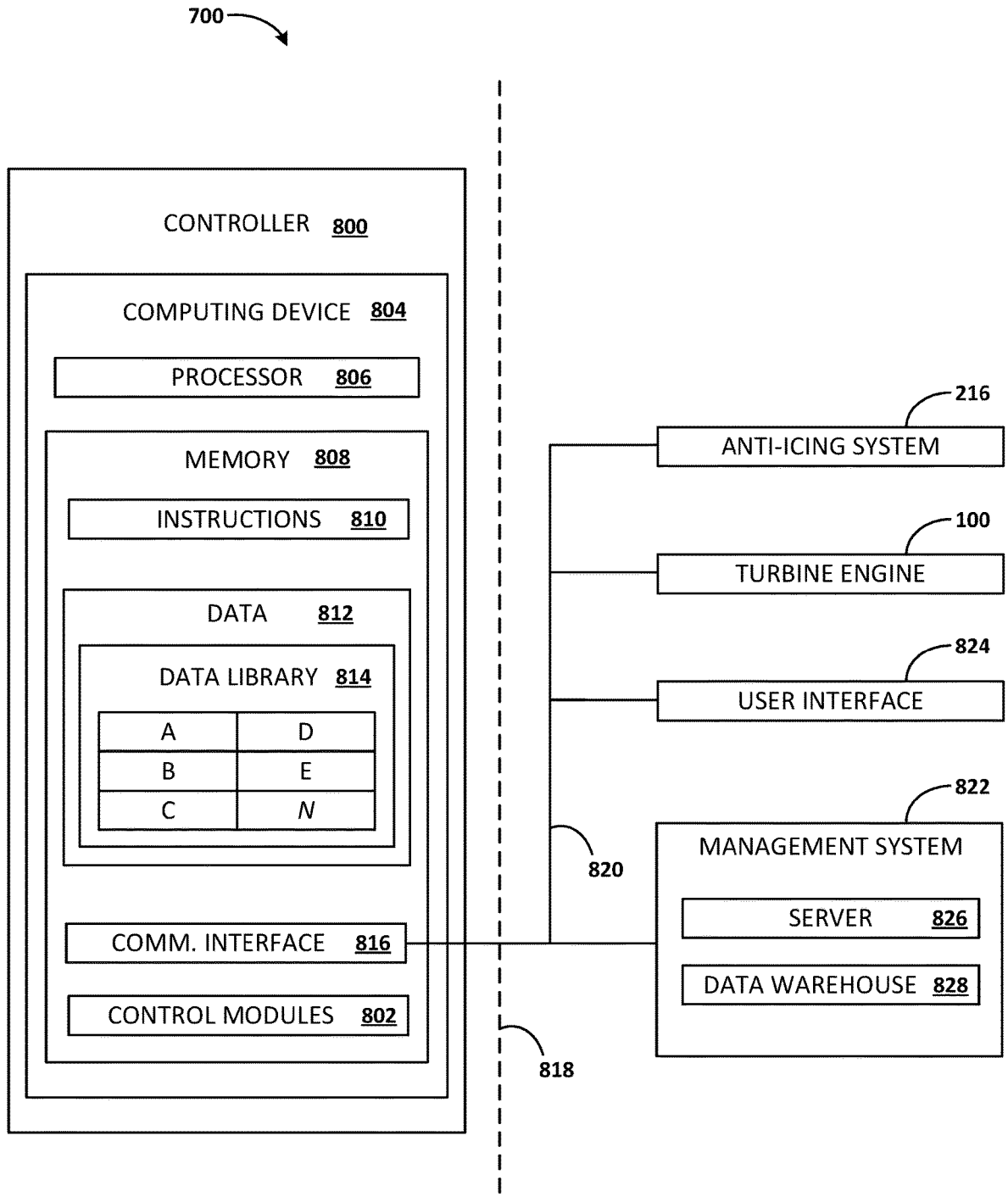
FIG. 8 schematically depicts an exemplary control system.

Referring now to FIG. 8, an exemplary control system 700 is further described. A control system 700 may be configured to perform one or more control operations associated with an anti-icing system 216. The control operations may include, determining and/or outputting control commands associated with one or more controllable components of the anti-icing system 216, such as control commands configured to actuate a fluid supply valve 702, for example, to start, stop, and/or modulate a flow of heating fluid through one or more heating conduits 218 respectively disposed within an edge guard 200 attached to a fan blade 108 or an outlet guide vane 148.

As shown in FIG. 8, an exemplary control system 700 may include a controller 800. The controller 800 may be communicatively coupled with one or more components of a turbine engine 100 and/or an anti-icing system 216. With additional reference to FIG. 7, the controller 800 may be communicatively coupled with one or more sensors, such as one or more atmospheric sensors 704, one or more heating fluid-temperature sensors 706, and/or one or more airfoil-temperature sensors 708. Additionally, or in the alternative, the controller 800 may be communicatively coupled with one or more controllable components, such as a fluid supply valve 702.

The controller 800 may include one or more control modules 802 configured to cause the controller 800 to perform one or more control operations, for example, based at least in part on an input from one or more sensors. In some embodiments, a control module 802 may be configured to determine a threshold or setpoint for starting, stopping, increasing, and/or decreasing anti-icing, such as a setpoint for starting, stopping, and/or modulating a flow of heating fluid into a plurality of heating conduits 218 respectively disposed within respective ones of a plurality of fan blades 108 and/or outlet guide vanes 148. The setpoint may be determined based at least in part on one or more atmospheric conditions favorable for formation and/or accumulation of ice on an airfoil of a turbine engine 100, such as fan blades 108 and/or outlet guide vanes 148 based at least in part on an input from one or more sensors. Additionally, or in the alternative, a control module 802 may be configured to generate control commands configured to start, stop, or modulate a flow of heating fluid based at least in part on an input from one or more sensors. A control module 802 may include control logic executable to provide control commands configured to control one or more controllable components associated with an anti-icing system 216. For example, a control module 802 may be configured to provide one or more control commands executable to control operation of a fluid supply valve 702, for example, based at least in part on an input from one or more sensors, such as an atmospheric sensor 704, a heating fluid-temperature sensor 706, and/or an airfoil-temperature sensor 708. The control commands may be configured to perform methods of inhibiting formation and/or accumulation of ice on an airfoil 300 of a turbine engine 100, such methods of inhibiting formation and/or accumulation of ice on a fan blade 108 or an outlet guide vane 148 and/or an edge guard 200 attached thereto.

The controller 800 may include one or more computing devices 804, which may be located locally or remotely relative to a turbine engine 100. The control system 700 may include one or more computing devices 804. In some embodiments, the one or more computing devices 804 may be configured as an engine control unit, an electronic engine controller, a full-authority digital engine control (FADEC) device, or the like. The one or more computing devices 804 may include one or more processors 806 and one or more memory devices 808. The one or more processors 806 may include any suitable processing device, such as a microprocessor, microcontroller, integrated circuit, logic device, and/or other suitable processing device. The one or more memory devices 808 may include one or more computer-readable media, including but not limited to non-transitory computer-readable media, RAM, ROM, hard drives, flash drives, and/or other memory devices 808.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 808 may include, but is not limited to, a non-transitory computer-readable medium, such as a random-access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 808 may store information accessible by the one or more processors 806, including computer-executable instructions 810 that can be executed by the one or more processors 806. The instructions 810 may include any set of instructions which when executed by the one or more processors 806 cause the one or more processors 806 to perform operations, including operations associated with one or more control modules 802 and/or operations associated with methods of inhibiting formation and/or accumulation of ice on an airfoil 300 of a turbine engine 100, such as a fan blade 108 or an outlet guide vane 148 and/or an edge guard 200 attached thereto.

The memory devices 808 may store data 812 accessible by the one or more processors 806. The data 812 can include current or real-time data 812, past data 812, or a combination thereof. The data 812 may be stored in a data library 814. As examples, the data 812 may include data 812 associated with or generated by a turbine engine 100 and/or an anti-icing system 216, such as data associated with one or more atmospheric sensors 704, one or more heating fluid-temperature sensors 706, and/or one or more airfoil-temperature sensors 708. Additionally, or in the alternative, the data 812 may include data 812 associated with or generated by one or more control modules 802. The data 812 may also include other data sets, parameters, outputs, information, associated with the control system 700.

The one or more computing devices 804 may also include a communication interface 816, which may be used for communications with a communication network 818 via wired or wireless communication lines 820. The communication interface 816 may allow the computing device 804 to communicate with various components of a turbine engine 100, and/or various components of an anti-icing system 216, communicatively coupled with the communication interface 816 and/or communicatively coupled with one another. The communication interface 816 may include any suitable components for interfacing with one or more network(s), including for example, transmitters, receivers, ports, controllers, antennas, and/or other suitable components. The communication interface 816 may allow the computing device 804 to communicate with various nodes on the communication network 818, such as nodes associated with the control modules 802, the turbine engine 100, and/or the anti-icing system 216. The communication network 818 may include, for example, a local area network (LAN), a wide area network (WAN), SATCOM network, VHF network, a HF network, a Wi-Fi network, a WiMAX network, a gatelink network, and/or any other suitable communication network 818 for transmitting messages to and/or from the controller 800 across the communication lines 820. The communication lines 820 of communication network 818 may include a data bus or a combination of wired and/or wireless communication links.

The control system 700 may also be communicatively coupled with a management system 822 and/or a user interface 824 via a wired or wireless communications network 818. The management system 822 and the control system 700 may be configured to interact with one another in connection with enterprise-level or fleet-level operations pertaining to the turbine engine 100, the control system 700, and/or the anti-icing system 216. Such enterprise level operations may include transmitting data from the management system 822 to the control system 700 and/or transmitting data from the control system 700 to the management system 822. The user interface 824 may include one or more user input/output devices to allow a user to interact with the control system 700. The management system 822 may include a server 826 and/or a data warehouse 828. As an example, at least a portion of the data 812 may be stored in the data warehouse 828, and the server 826 may be configured to transmit data 812 from the data warehouse 828 to the computing device 804, and/or to receive data 812 from the computing device 804 and to store the received data 812 in the data warehouse 828 for further purposes. The server 826 and/or the data warehouse 828 may be implemented as part of a control system 700 and/or as part of the management system 822.

Figure 9:
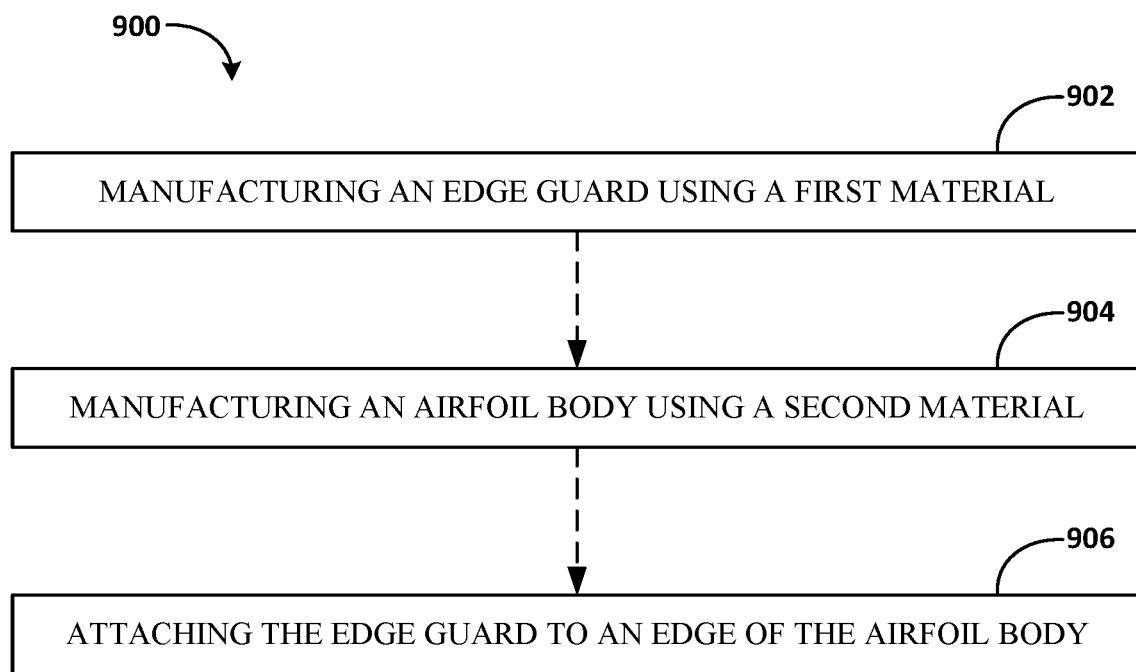
FIG. 9 shows a flow chart depicting a method of manufacturing an airfoil for a fan section of a turbine engine.

Now referring to FIG. 9, exemplary methods of manufacture are described. An exemplary method of manufacture may include methods of manufacturing an edge guard 200, methods of manufacturing an airfoil 300, such as a fan blade 108 or an outlet guide vane 148, and/or methods of manufacturing a fan or a fan section 102 for a turbine engine 100, and/or methods of manufacturing a turbine engine 100. As shown in FIG. 9, an exemplary method 900 may include, at block 902, manufacturing an edge guard 200 using a first material. The edge guard 200 may be configured according to the present disclosure. The edge guard 200 may be manufactured using an additive manufacturing technology or other suitable technology, such as forging, casting, composite layup, molding, etc. In some embodiments, the edge guard 200 may be manufactured from a matrix composite. Additionally, or in the alternative, the edge guard 200 may be manufactured from a metal alloy. At block 904, an exemplary method 900 may include manufacturing an airfoil body 304 using a second material. The airfoil body 304 may be a body of a fan blade 108 or an outlet guide vane 148. The airfoil body 304 may be manufactured using any suitable technology, such as additive manufacturing, forging, casting, composite layup, molding, etc. In some embodiments, the airfoil body 304 may be manufactured from a matrix composite. Additionally, or in the alternative, airfoil body 304 may be manufactured from a metal alloy. At block 906, an exemplary method 900 may include attaching the edge guard 200 to an edge of the airfoil body 304. In some embodiments, the edge guard 200 may be attached to the airfoil body 304, such as an airfoil body 304 for a fan blade 108 or an outlet guide vane 148, by an adhesive layer 306. The adhesive layer 306 may adhere the edge guard 200 to the airfoil body 304 by any suitable mechanism, including heat curing, moisture curing, UV curing, catalytic curing, or the like. Additionally, or in the alternative, the edge guard 200 may be attached to the airfoil body 304 by any suitable technology, such as co-molding, welding, shrink fitting, mechanical fastening, and the like. In some embodiments, the edge guard 200 may be attached to the airfoil body 304 concurrently with manufacturing the airfoil body 304 at block 904, such as when the airfoil body 304 is formed using a co-molding process, a composite layup process, a casting process, etc. The fan blade 108 or an outlet guide vane 148 may be configured according to the present disclosure.

Figure 10:
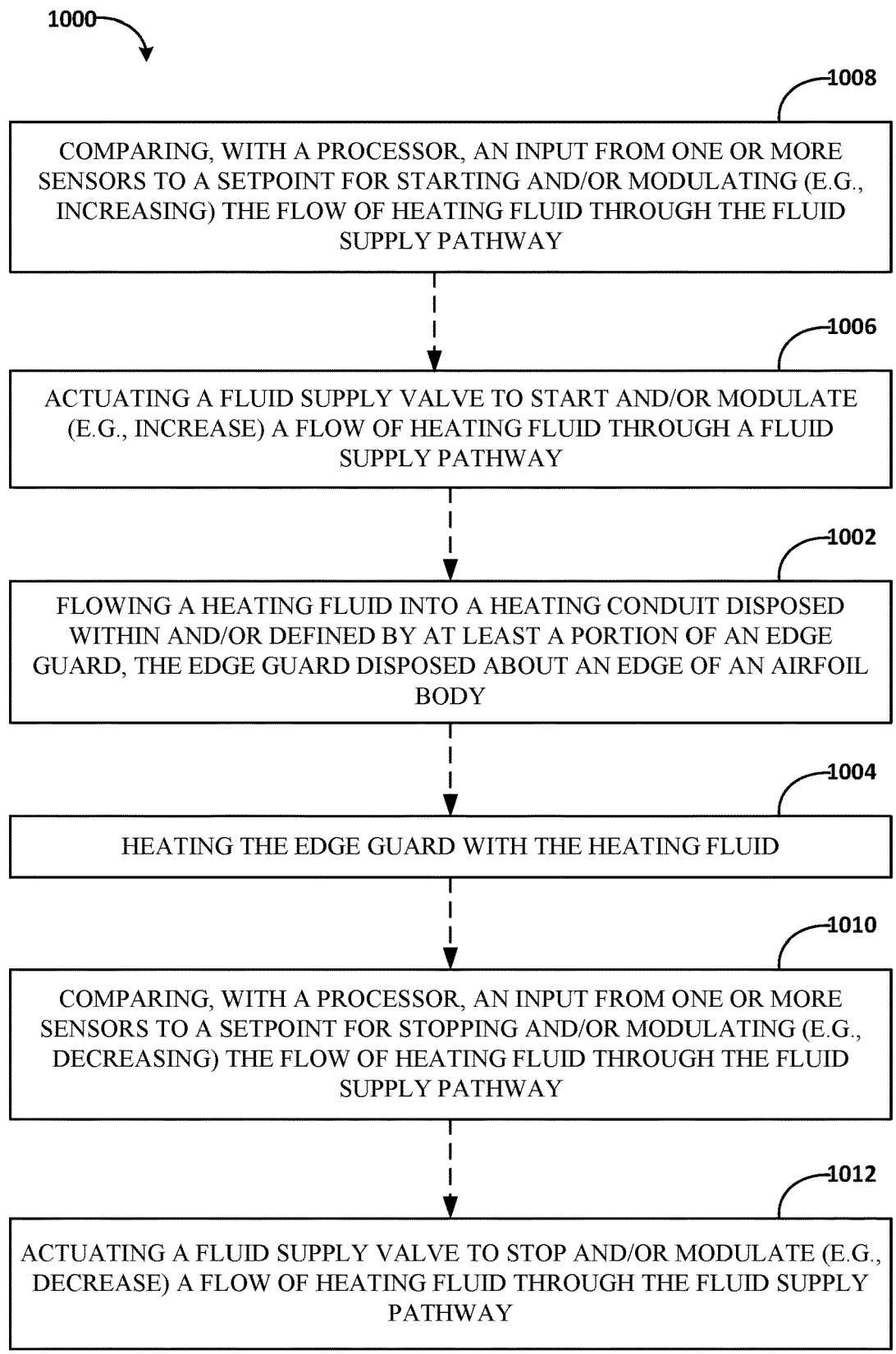
FIG. 10 shows a flow chart depicting an exemplary method of inhibiting formation and/or accumulation of ice on an airfoil of a turbine engine, such as a fan blade or an outlet guide vane.

Now referring to FIG. 10, exemplary methods 1000 of inhibiting formation and/or accumulation of ice on an airfoil 300 of a fan section 102 of a turbine engine 100 are described, such methods 1000 of inhibiting formation and/or accumulation of ice on a fan blade 108 or an outlet guide vane 148. An exemplary method 1000 may include, at block 1002, flowing a heating fluid into a heating conduit 218 disposed within and/or defined by at least a portion of an edge guard 200, the edge guard 200 disposed about an edge 308 of an airfoil body 304, such as an edge 308 of a fan blade 108 or an edge 308 of an outlet guide vane 148. At block 1004, an exemplary method 1000 may include heating the edge guard 200 with the heating fluid. The edge guard 200 may be heated to a temperature sufficient to inhibit formation and/or accumulation of ice on the edge guard 200. Additionally, or in the alternative, the edge guard 200 may be heated to a temperature sufficient to inhibit formation and/or accumulation of ice on the fan blade 108 or the outlet guide vane 148 to which the edge guard 200 is attached. For example, the heating fluid may heat the edge guard 200 to a temperature of from about 0° Celsius (C) to about 100° C., such as from about 0° C. to about 30° C., such as from about 0° C. to about 10° C.

In some embodiments, an exemplary method 1000 may include, at block 1006, actuating a fluid supply valve 702 to start and/or modulate (e.g., increase) a flow of heating fluid through a fluid supply pathway 220. The fluid supply valve 702 may be actuated based at least in part on an input from one or more sensors. For example, the fluid supply valve may be actuated based at least in part on a comparison of the input to a setpoint. The fluid supply valve 702 may be actuated to start and/or modulate (e.g., increase) a flow of heating fluid through the fluid supply pathway 220 when the input from the one or more sensors meets or passes a setpoint corresponding to one or more atmospheric conditions favorable for formation and/or accumulation of ice on an airfoil 300 of a turbine engine 100, such as fan blades 108 and/or outlet guide vanes 148. Additionally, or in the alternative, the fluid supply valve 702 may be actuated to start and/or modulate (e.g., increase) a flow of heating fluid through the fluid supply pathway 220 when the input from the one or more sensors meets or passes a setpoint corresponding to a temperature value from a heating fluid-temperature sensor 706, and/or a temperature value from an airfoil-temperature sensor 708. At block 1008, in some embodiments, an exemplary method 1000 may include comparing, with a processor, an input from one or more sensors to a setpoint for starting and/or modulating the flow of heating fluid through the fluid supply pathway. The input from the one or more sensors may include an input from an atmospheric sensor 704, an input from a heating fluid-temperature sensor 706, and/or an input from an airfoil-temperature sensor 708.

In some embodiments, an exemplary method 1000 may include, at block 1010, comparing, with a processor, an input from one or more sensors to a setpoint for stopping and/or modulating (e.g., decreasing) the flow of heating fluid through the fluid supply pathway. The setpoint for stopping and/or modulating (e.g., decreasing) the flow of heating fluid through the fluid supply pathway may correspond to one or more atmospheric conditions unfavorable for formation and/or accumulation of ice on an airfoil 300 of a turbine engine 100, such as fan blades 108 and/or outlet guide vanes. 148. Additionally, or in the alternative, the setpoint for stopping and/or modulating (e.g., decreasing) the flow of heating fluid through the fluid supply pathway may correspond to a temperature value from a heating fluid-temperature sensor 706, and/or a temperature value from an airfoil-temperature sensor 708.

At block 1012, an exemplary method 1000 may include actuating the fluid supply valve 702 to stop and/or modulate (e.g., decrease) the flow of heating fluid through the fluid supply pathway 220. The fluid supply valve 702 may be actuated based at least in part on an input from one or more sensors. The input from the one or more sensors may be indicative of one or more atmospheric conditions unfavorable for formation and/or accumulation of ice on an airfoil 300 of a turbine engine 100, such as fan blades 108 and/or outlet guide vanes 148. Additionally, or in the alternative, the input from the one or more sensors may include an input from a heating fluid-temperature sensor 706, and/or an input from an airfoil-temperature sensor 708. Such input from the one or more sensors may be indicative of heat sufficient to prevent or mitigate icing having been imparted to the edge guards 200 (and/or to the respective fan blades 108 and/or outlet guide vanes 148 to which the edge guards 200 are attached) by the flow of heating fluid passing therethrough.

Further aspects of the invention are provided by the subject matter of the following clauses:

An airfoil for a fan section of a turbine engine, the airfoil comprising: an airfoil body and an edge guard disposed about an edge of the airfoil body, wherein the edge guard comprises a heating conduit disposed within and/or defined by at least a portion of the edge guard.

The airfoil of any clause herein, wherein the airfoil comprises a fan blade or an outlet guide vane The airfoil any clause herein, wherein the edge guard is attached to a forward portion of the airfoil body.

The airfoil any clause herein, wherein the heating conduit defines a portion of an anti-icing system, the anti-icing system comprising a fluid supply pathway configured to supply heating fluid to the heating conduit.

The airfoil any clause herein, wherein at least a portion of the edge guard has a monolithic structure.

The airfoil any clause herein, wherein at least a portion of the heating conduit is defined by an internal structure of the edge guard.

The airfoil any clause herein, wherein the airfoil body comprises a heating fluid inlet, the heating fluid inlet fluidly communicating with the heating conduit.

The airfoil of any clause herein, wherein the heating fluid inlet is located at one or more of: a root region of the airfoil body and a dovetail region of the airfoil body.

The airfoil of any clause herein, wherein the airfoil body comprises a fluid supply conduit defined at least in part by a structure of the airfoil body, the fluid supply conduit providing fluid communication between the heating fluid inlet and the heating conduit.

The airfoil any clause herein, wherein the edge guard comprises one or more heating fluid outlets defined at least in part by a structure of the edge guard, the one or more heating fluid outlets located at a portion of the edge guard adjacent to a working region of the airfoil body.

The airfoil any clause herein, wherein the airfoil body comprises one or more heating fluid outlets in fluid communication with the heating conduit, the one or more heating fluid outlets located at one or more of: a working region of the airfoil body, a root region of the airfoil body, and a dovetail region of the airfoil body.

The airfoil any clause herein, wherein the airfoil body comprises a fluid discharge conduit defined at least in part by a structure of the airfoil body, the fluid discharge conduit providing fluid communication between the heating conduit and the one or more heating fluid outlets.

The airfoil any clause herein, wherein the edge guard is attached to the airfoil at least in part by an adhesive layer.

The airfoil any clause herein, wherein the edge guard comprises a lattice structure that defines a matrix or network of at least one of: pores, voids, and channels.

The airfoil any clause herein, wherein the lattice structure defines at least a portion of the heating conduit.

The airfoil any clause herein, wherein the heating conduit comprises at least one of: a pathway from a proximal region of the edge guard towards a distal region of the edge guard; a pathway from a distal region of the edge guard towards a proximal region of the edge guard; a pathway that leads to a plurality of heating fluid outlets distributed about at least one of: a radial axis of the edge guard, a forward region of the edge guard, and a lateral region of the edge guard.

The airfoil any clause herein, wherein the lattice structure defines at least one of: a fluid domain and a ductile domain.

The airfoil any clause herein, wherein the lattice structure has a toughness that is greater than a toughness of a body material of the edge guard.

The airfoil of any clause herein, wherein the lattice structure comprises at least one of: a fluid domain disposed about a proximal region of the edge guard and a toughened domain disposed about a distal region of the edge guard; the fluid domain and the toughened domain disposed about a medial region of the edge guard; the fluid domain and the toughened domain respectively spanning from the proximal region if the edge guard to the distal region of the edge guard; and the fluid domain spanning from the proximal region of the edge guard to the medial region of the edge guard, and the toughened domain spanning from the medial region of the edge guard to the distal region of the edge guard.

The airfoil of any clause herein, wherein the lattice structure gradually or abruptly transitions from a fluid domain to a toughened domain.

The airfoil of any clause herein, wherein the lattice structure comprises one or more outlet channels that provide fluid communication between the heating conduit and one or more heating fluid outlets.

The airfoil of any clause herein, comprising: a first lattice structure separated from a second lattice structure by a boundary wall or a body region, wherein the first lattice structure comprises a toughened domain located at a forward region of the edge guard, and wherein the second lattice structure comprises a fluid domain located at one or more of: a lateral region and an inward region of the edge guard.

The airfoil of any clause herein, wherein the airfoil body comprises a first metal alloy, and wherein the edge guard comprises a second metal alloy.

The airfoil of any clause herein, wherein the airfoil body comprises at least one of: an aluminum-lithium alloy and a titanium-aluminum alloy, and wherein the edge guard comprises a titanium alloy.

The airfoil of any clause herein, wherein the airfoil body comprises a metal alloy, and wherein the edge guard comprises a matrix composite.

The airfoil of any clause herein, wherein the matrix composite has an elastic modulus that is less than an elastic modulus of the material used to form the airfoil.

The airfoil of any clause herein, wherein the airfoil body comprises a first matrix composite, and wherein the edge guard comprises a second matrix composite.

The airfoil of any clause herein, wherein the airfoil body comprises a matrix composite, and wherein the edge guard comprises a metal alloy.

The airfoil of any clause herein, configured according to an airfoil included in the fan of any clause herein.

An airfoil for a fan section of a turbine engine, the airfoil comprising: an airfoil body and an edge guard disposed about an edge of the airfoil body, wherein the airfoil body comprises a first material, and wherein the edge guard comprises a matrix composite, wherein the matrix composite has a toughness that is greater than a toughness of the first material.

The airfoil any clause herein, wherein the airfoil comprises a fan blade or an outlet guide vane.

The airfoil any clause herein, wherein the first material comprises a metal alloy, the metal alloy comprising at least one of: a stainless-steel alloy, a cobalt-chrome alloy, an aluminum alloy, a titanium alloy, a nickel-based superalloy, and a cobalt-based superalloy.

The airfoil any clause herein, wherein the metal alloy comprises at least one of: an aluminum-lithium alloy and a titanium-aluminum alloy.

The airfoil any clause herein, wherein the matrix composite comprises a metal matrix composite, a ceramic matrix composite, or a polymer matrix composite.

The airfoil any clause herein, wherein the matrix composite comprises a matrix material and a reinforcing material, wherein the reinforcing material comprises at least one of: fibers, nanotubes, whiskers, platelets, and particles.

The airfoil of any clause herein, wherein the reinforcing material comprises at least one of: carbon, graphite, graphene, alumina, mullite, iron, silicon carbide, aluminum nitride, silicon nitride, zirconia, and silica.

The airfoil of any clause herein, wherein the reinforcing material comprises carbon nanotubes.

The airfoil of any clause herein, wherein the reinforcing material comprises a metal alloy.

The airfoil of any clause herein, wherein the reinforcing material comprises a shape-memory alloy.

The airfoil of any clause herein, wherein the matrix composite comprises a metal matrix composite, the metal matrix composite comprising a metal-alloy matrix and a reinforcing material, wherein the metal-alloy matrix comprises at least one of: a stainless-steel alloy, a cobalt-chrome alloy, an aluminum alloy, a titanium alloy, a nickel-based superalloy, and a cobalt-based superalloy.

The airfoil of any clause herein, wherein the matrix composite comprises a metal matrix composite, the metal matrix composite comprising a metal-alloy matrix and a reinforcing material, wherein the metal-alloy matrix comprises a shape-memory alloy.

The airfoil of any clause herein, wherein the matrix composite comprises a ceramic matrix composite, the ceramic matrix composite comprising a ceramic matrix and a reinforcing material, wherein the ceramic matrix comprises at least one of: alumina, beryllia, ceria, zirconia, carbide, boride, nitride, and silicide.

The airfoil any clause herein, wherein the ceramic matrix comprises at least one of: silicon carbide, aluminum silicate, aluminum nitride, silicon nitride, and titanium carbide.

The airfoil any clause herein, wherein the matrix composite comprises a polymer matrix composite, the polymer matrix composite comprising a polymer matrix and a reinforcing material, wherein the polymer matrix comprises at least one of: a thermoplastic polymer and/or thermosetting polymer.

The airfoil any clause herein, wherein the polymer matrix comprises a thermoplastic elastomer, the thermoplastic elastomer comprising at least one of: a thermoplastic polyurethane, a thermoplastic copolyester, a thermoplastic polyamide, a thermoplastic polyolefinelastomer, a thermoplastic vulcanizate, and a styrenic block copolymer.

The airfoil any clause herein, wherein the polymer matrix comprises at least one of: an epoxy resin, a polyurethane resin, a phenolic resin.

The airfoil any clause herein, wherein the polymer matrix comprises a thermoplastic polyurethane and wherein the reinforcing material comprises carbon nanotubes.

The airfoil of any clause herein, wherein the airfoil body comprises a metal alloy and/or a matrix composite.

The airfoil of any clause herein, wherein the edge guard comprises a second matrix composite.

The airfoil of any clause herein, wherein the first and/or second matrix composite respectively includes a metal matrix composite, a ceramic matrix composite, or a polymer matrix composite.

A turbine engine, comprising: a core engine, comprising: a compressor section, a combustor section, and a turbine section, a shaft extending axially through the compressor section, the combustor section, and the turbine section, and an engine case encasing the compressor section, the combustor section, and the turbine section, the engine case defining a core engine-inlet, an exhaust nozzle, and a core air flowpath extending from the core engine-inlet to the exhaust nozzle, the core air flowpath passing, in serial flow relationship, through the compressor section, the combustor section, and the turbine section; a fan section coupled to the shaft of the core engine, wherein the fan section comprises a plurality of airfoils, respective ones of the plurality of airfoils comprising an airfoil body and an edge guard disposed about an edge of the airfoil body, wherein the edge guard comprises a heating conduit disposed within and/or defined by at least a portion of the edge guard, and wherein the airfoil comprises a fan blade or an outlet guide vane; and an anti-icing system, the anti-icing system comprising a fluid supply pathway configured to supply heating fluid to the respective ones of the plurality of heating conduits, wherein the heating fluid comprises bleed air from the core air flowpath.

A turbine engine, comprising: a core engine, comprising: a compressor section, a combustor section, and a turbine section, a shaft extending axially through the compressor section, the combustor section, and the turbine section, and an engine case encasing the compressor section, the combustor section, and the turbine section, the engine case defining a core engine-inlet, an exhaust nozzle, and a core air flowpath extending from the core engine-inlet to the exhaust nozzle, the core air flowpath passing, in serial flow relationship, through the compressor section, the combustor section, and the turbine section; a fan section coupled to the shaft of the core engine, wherein the fan section comprises a plurality of airfoils, respective ones of the plurality of airfoils comprising: an airfoil body and an edge guard disposed about an edge of the airfoil body, wherein the airfoil body comprises a first material, and wherein the edge guard comprises a matrix composite, wherein the matrix composite has a toughness that is greater than a toughness of the first material.

The turbine engine of any clause herein, comprising: a power gearbox, the power gearbox coupling a fan of the fan section to the shaft of the core engine, wherein the power gearbox provides a gear ratio that allows the fan to exhibit a fan tip speed that is less than the speed of sound when the turbine engine is operating within at least 80% of a rated speed for the turbine engine.

The turbine engine of any clause herein, comprising the airfoil of any clause herein.

A method of inhibiting formation and/or accumulation of ice on an airfoil of a fan section of a turbine engine, the method comprising: flowing a heating fluid into a heating conduit disposed within and/or defined by at least a portion of an edge guard, the edge guard disposed about an edge of an airfoil body; and heating the edge guard with the heating fluid; wherein the airfoil comprises a fan blade or an outlet guide vane.

The method of any clause herein, wherein the method is performed using the turbine engine of any clause herein.

A method of manufacturing an airfoil for a fan section of a turbine engine, the method comprising: manufacturing an edge guard comprising a matrix composite; manufacturing an airfoil body comprising a first material; and attaching the edge guard to an edge of the airfoil body; wherein the matrix composite has a toughness that is greater than a toughness of the first material.

The method of any clause herein, wherein the airfoil comprises the airfoil of any clause herein.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An airfoil for a fan section of a turbine engine, the airfoil comprising:
    an airfoil body and an edge guard disposed about a leading edge of the airfoil body, wherein the airfoil body comprises a first material, and wherein the edge guard comprises a matrix composite, wherein the matrix composite has a toughness that is greater than a toughness of the first material, and wherein the edge guard comprises a heating conduit disposed within at least a portion of the edge guard.

2. The airfoil of claim 1, wherein the airfoil comprises a fan blade or an outlet guide vane.

3. The airfoil of claim 1, wherein the first material comprises a metal alloy, the metal alloy comprising a stainless-steel alloy, a cobalt-chrome alloy, an aluminum alloy, a titanium alloy, a nickel-based superalloy, or a cobalt-based superalloy.

4. The airfoil of claim 3, wherein the metal alloy comprises an aluminum-lithium alloy.

5. The airfoil of claim 1, wherein the matrix composite comprises a metal matrix composite, a ceramic matrix composite, or a polymer matrix composite.

6. The airfoil of claim 1, wherein the matrix composite comprises a ceramic matrix material and a reinforcing material, wherein the reinforcing material comprises fibers, nanotubes, whiskers, platelets, or particles.

7. The airfoil of claim 6, wherein the reinforcing material comprises carbon, graphite, graphene, alumina, mullite, iron, silicon carbide, aluminum nitride, silicon nitride, zirconia, or silica.

8. The airfoil of claim 7, wherein the reinforcing material comprises carbon nanotubes.

9. The airfoil of claim 6, wherein the reinforcing material comprises a metal alloy.

10. The airfoil of claim 6, wherein the reinforcing material comprises a shape-memory alloy.

11. The airfoil of claim 5, wherein the matrix composite comprises a metal matrix composite, the metal matrix composite comprising a metal-alloy matrix and a reinforcing material, wherein the metal-alloy matrix comprises a stainless-steel alloy, a cobalt-chrome alloy, an aluminum alloy, a titanium alloy, a nickel-based superalloy, or a cobalt-based superalloy.

12. The airfoil of claim 5, wherein the matrix composite comprises a metal matrix composite, the metal matrix composite comprising a metal-alloy matrix and a reinforcing material, wherein the metal-alloy matrix comprises a shape-memory alloy.

13. The airfoil of claim 5, wherein the matrix composite comprises a ceramic matrix composite, the ceramic matrix composite comprising a ceramic matrix and a reinforcing material, wherein the ceramic matrix comprises alumina, beryllia, ceria, zirconia, carbide, boride, nitride, or silicide.

14. The airfoil of claim 13, wherein the ceramic matrix comprises silicon carbide, aluminum silicate, aluminum nitride, silicon nitride, or titanium carbide.

15. The airfoil of claim 5, wherein the matrix composite comprises a polymer matrix composite, the polymer matrix composite comprising a polymer matrix and a reinforcing material, wherein the polymer matrix comprises a thermoplastic polymer or thermosetting polymer.

16. The airfoil of claim 15, wherein the polymer matrix comprises a thermoplastic elastomer, the thermoplastic elastomer comprising a thermoplastic polyurethane, a thermoplastic copolyester, a thermoplastic polyamide, a thermoplastic polyolefinelastomer, a thermoplastic vulcanizate, or a styrenic block copolymer.

17. The airfoil of claim 15, wherein the polymer matrix comprises an epoxy resin, a polyurethane resin, or a phenolic resin.

18. The airfoil of claim 15, wherein the polymer matrix comprises a thermoplastic polyurethane and wherein the reinforcing material comprises carbon nanotubes.

19. A turbine engine, comprising:
    a core engine, comprising:
        a compressor section, a combustor section, and a turbine section,
        a shaft extending axially through the compressor section, the combustor section, and the turbine section, and
        an engine case encasing the compressor section, the combustor section, and the turbine section, the engine case defining a core engine-inlet, an exhaust nozzle, and a core air flowpath extending from the core engine-inlet to the exhaust nozzle, the core air flowpath passing, in serial flow relationship, through the compressor section, the combustor section, and the turbine section;

a fan section coupled to the shaft of the core engine, wherein the fan section comprises a plurality of airfoils, respective ones of the plurality of airfoils comprising:

an airfoil body and an edge guard disposed about a leading edge of the airfoil body, wherein the airfoil body comprises a first material, and wherein the edge guard comprises a matrix composite, wherein the matrix composite has a toughness that is greater than a toughness of the first material, and wherein the edge guard comprises a heating conduit disposed within at least a portion of the edge guard.

20. A method of manufacturing an airfoil for a fan section of a turbine engine, the method comprising:

manufacturing an edge guard comprising a matrix composite;

manufacturing an airfoil body comprising a first material; and attaching the edge guard to a leading edge of the airfoil body;

wherein the matrix composite has a toughness that is greater than a toughness of the first material, and wherein the edge guard comprises a heating conduit disposed within at least a portion of the edge guard.

* * * * *